United States Patent
Takayama

(10) Patent No.: US 7,043,085 B2
(45) Date of Patent: May 9, 2006

(54) WORK IDENTIFICATION SYSTEM AND SIGNATURE MANAGEMENT SYSTEM

(75) Inventor: Yoshimitsu Takayama, Tokyo (JP)

(73) Assignee: Asahi Garou Kabushikigaisya, Shibuya-ku (JP)

(*) Notice: Subject to any disclaimer, the term of this patent is extended or adjusted under 35 U.S.C. 154(b) by 777 days.

(21) Appl. No.: 10/049,807

(22) PCT Filed: Jun. 15, 2001

(86) PCT No.: PCT/JP01/05138

§ 371 (c)(1),
(2), (4) Date: Feb. 13, 2002

(87) PCT Pub. No.: WO01/97163

PCT Pub. Date: Dec. 20, 2001

(65) Prior Publication Data

US 2002/0172424 A1    Nov. 21, 2002

(30) Foreign Application Priority Data

Jun. 16, 2000 (JP) ............................ 2000-181888
Jun. 27, 2000 (JP) ............................ 2000-193268
Jun. 27, 2000 (JP) ............................ 2000-193269

(51) Int. Cl.
*G06K 9/62* (2006.01)

(52) U.S. Cl. ..................... 382/228; 382/218

(58) Field of Classification Search ............... 382/115, 382/119, 181, 209, 218, 228, 305, 306; 713/170, 713/176, 178, 180; 340/572.1
See application file for complete search history.

(56) References Cited

U.S. PATENT DOCUMENTS

| | | | | |
|---|---|---|---|---|
| 4,040,010 A | * | 8/1977 | Crane et al. | 382/121 |
| 4,918,723 A | * | 4/1990 | Iggulden et al. | 379/100.17 |
| 5,309,246 A | * | 5/1994 | Barry et al. | 358/1.9 |
| 5,673,338 A | * | 9/1997 | Denenberg et al. | 382/209 |
| 6,611,598 B1 | * | 8/2003 | Hayosh | 380/54 |

FOREIGN PATENT DOCUMENTS

EP      523 908 A2    1/1993
WO      WO 94/29817 A1    12/1994

OTHER PUBLICATIONS

Clark, R.M. et al., "A Model For Comparing Signatures," *Proceedings of the International Conference on Systems, Man, and Cybernetics*, Los Angeles, Nov. 4-7, 1990, New York, IEEE, Nov. 4, 1990, pp. 326-330.

* cited by examiner

*Primary Examiner*—Daniel Miriam
(74) *Attorney, Agent, or Firm*—Christensen O'Connor Johnson Kindness PLLC

(57) ABSTRACT

A work identification system comprises a work storage configured to store digital data representing at least one of a shape, area, and color of an only one work, a collation section configured to calculate a degree of deviation between digital data representing at least one of a shape, area, and color of a target work to be identified and the digital data stored in the work storage, and a test section configured to perform a test of hypothesis based on a predetermined hypothesis using the degree of deviation.

21 Claims, 9 Drawing Sheets

WORK IDENTIFICATION SYSTEM AND SIGNATURE MANAGEMENT SYSTEM

This application is a U.S. national phase application under 35 U.S.C. § 371 of International Application No. PCT/JP01/05138, filed Jun. 15, 2001, and published in English.

TECHNICAL FIELD

The present invention relates to a system for identifying a specific work of art (the only one work that exists in the world) such as a picture or a photograph and a signature management system for managing a signature of a work of art (hereinafter simply referred to as a "work").

BACKGROUND ART

An identification system according to the present invention judges the identity between a number of reference works and only one work, from amongst works of art, crafts, antiques, jewels, such as pictures, photographs, block prints, pasted pictures, sculptures, statues, pots, earthenware, calligraphy, a created shape, object or shape formed by an artist, thereby making it possible to identify the creator of the work from the judgment result or search for the most similar work. In particular, attention is paid to the signature of the work, whereby precise judgment of the work's identity can be performed with the smallest amount necessary of digital data.

The present method for verifying a specific work of art or the author is mainly achieved by visual inspection, knowledge, or experience of an expert in the field, or by the creator themselves. Therefore, the author of the work sometimes cannot be identified preciously, or cannot be done so immediately. In addition, even if an attempt is made to identify a work, such an identification method is difficult to master, and is not obvious to everyone.

For example, assume that a photograph of a work "A" is included in a yearbook of arts & crafts. When a work "B" appears, the work "B" is photographed, and is compared with work "A" of the yearbook. If these works are identical to each other, the works "A" and "B" can be identified to be the same works, and the author of the work "B" can be identified to be the author of the work "A" in the yearbook.

However, even if the works "A" and "B" are identical, it is difficult to physically evaluate the photography methods and conditions of the works "A" and "B". Thus, precise identification is difficult.

Examples of differences produced because of photography are shown below.

Example 1: As pigments in pictures of works degrade with the lapse of time, color fading or color changes may occur. When the same works are photographed at different times, a difference in color occurs.

Example 2: The change light of the photography conditions, caused by reflection or refraction. Even if the conditions such as atmospheric, light, color temperature, type of lenses used, relative position of a projection face relevant to the work, etc. are reproduced, a difference still occurs with the shape, area, and color of the photograph produced.

Therefore, even if the works "A" and "B" are identical to each other, when the photographic work "A" is compared simply with that of the work "B", a differences exist between them, thus making it difficult to indicate the identicalness of works "A" and "B".

In addition, at present, there is a database for searching for works with a character string such as work name or author's name defined as a key. However, in the case where a work is present at hand, but the work name or author's name is unknown, even if an extensive search is conducted the work name or author may not necessarily be found.

In such a conventional work identity judgment system, a more precise method of verification is requested irrespective of an inspection, knowledge or experience of an expert in the field, or the creator of the work.

In addition, if the work name or author's name is unknown, it is difficult to conduct a search for the work as no parameters are available.

In addition, at present, a number of digital images of works such as photographs are used, and the digital images are distributed via the Internet. However, no signature is attached to these distributed images in advance. No signature is inserted into and distributed to a position determined when digital images and digitized signatures are provided, and digital images are distributed.

DISCLOSURE OF INVENTION

Accordingly, the present invention is directed to method and apparatus that substantially obviates one or more of the problems due to limitations and disadvantages of the related art.

According to one aspect of the present invention, there is provided a work identification system comprising:

a work storage configured to store digital data representing at least one of a shape, area, and color of an only one work;

a collation section configured to calculate a degree of deviation between digital data representing at least one of a shape, area, and color of a target work to be identified and the digital data stored in the work storage; and a test section configured to perform a test of hypothesis based on a predetermined hypothesis using the degree of deviation.

According to another aspect of the present invention, there is provided a signature management system comprising:

a signature storage configured to store signature data representing signatures;

a work storage configured to store work data representing works; and a signature inserting section configured to insert one of the signature data into one of the work data in response to a request received through a network from a requester and distribute the work data into which the signature data is inserted to the requester through the network.

According to still another aspect of the present invention, there is provided a signature management system comprising:

a signature storage configured to store signature data representing signatures; and a signature identifying section configured to collate an object signature data transmitted from a requester through a network and the signature data stored in the signature storage and return a result of collation to the requester through the network.

According to one aspect of the present invention, the work identification system electronically judges the identity of an only one work.

According to another aspect of the present invention, the signature management system electronically manages a signature of a work.

According to still another aspect of the present invention, the signature management system is capable of, before a digitized work is distributed, determines a proper position for inserting the signature on a digitized work, inserts the signature in that position and, and distributes the signature inserted work.

BEST MODE FOR CARRYING OUT OF THE INVENTION

Figure 1:
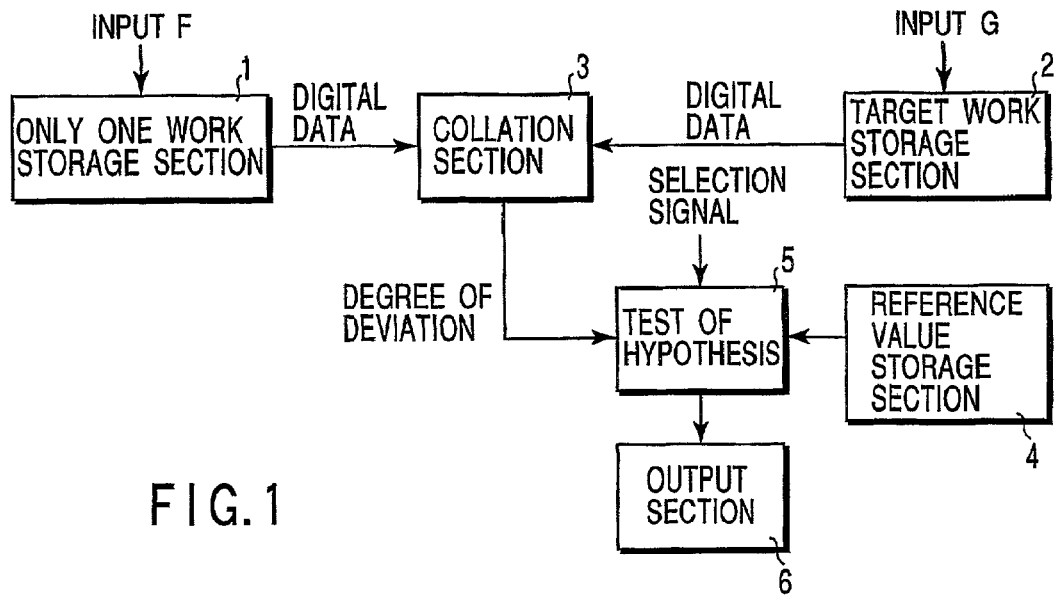
FIG. 1 is a block diagram of a work identification system according to a first embodiment of the present invention.

Hereinafter, embodiments of the present invention will be described with reference to the accompanying drawings.

First Embodiment

A work identification system for judging identity based on digital data of a specific work will be described in accordance with a first embodiment. Judgment of identity is performed when at least one of the shape, area, and color of a signature is defined as a judgment reference by using digital data of only a signature assigned to a work, instead of using digital data of the entire work. The degree of deviation in shape, the degree of deviation in area, and the degree of deviation in color are calculated, and the calculated degree of deviation is compared with a reference value, thereby making it possible to electronically identify a difference caused by a difference in photography conditions and photography equipment during electronic representation even in the same signatures with a difference between a signature of one work and another signature of a similar work. A test of hypothesis is used to obtain the result of identification.

The definitions of words used in the present invention will be described.

Only One Work: The singular work that exist in the world. This often denotes articles represented by works of art, crafts, antiques, jewels, such as pictures, photographs, block prints, pasted pictures, sculptures, statues, pots, earthenware, or calligraphy, a created shape, an object or shape formed by hand. The signature given to a work by the author corresponds that work only, and exists in a unique form. Thus, a signature can be used in order to identify the identity of only one work.

Projection: Converting information in one space into information in another space. For example, projecting an object in three-dimensional space by an analogue camera denotes projecting into a two-dimensional plane on a film. Projecting an object in three-dimensional space by a digital camera or scanner denotes projecting into a pixel plane that is a two-dimensional plane. Projecting a cross section of an object in three-dimensional space denotes projecting into a two-dimensional plane. Projecting into three-dimensional space is possible by projecting the cross section of an object in three-dimensional space a plurality of times. An object in a three-dimensional space is projected at a variety of angles, thereby enabling projection into three-dimensional space. Expressing an object in three-dimensional space as a two-dimensional function denotes projecting into a two-dimensional plane. Expressing an object in three-dimensional space as a three-dimensional function denotes projecting into three-dimensional space. Expressing data in a two-dimensional pixel plane as a two-dimensional function denotes projecting into a two-dimensional plane.

Digital Data: Digitized information. Images in a pixel plane, points, functions or the like in a two-dimensional plane are exemplified, but not limited thereto, and information expressed by a combination of numerals can be employed.

Hereinafter, a first embodiment of the present invention will be described in detail.

FIG. 1 is a block diagram showing a basic configuration of a work identification system according to the present invention.

Only one work is converted into electronic digital data from which information such as shape, area, and color can be derived. A work identity judgment system according to the present invention comprises an only one work storage section 1 including a memory for registering and storing digital data on such only one work as input F in advance; a target work storage section 2 including a memory for temporarily storing similar digital data on a work to be identified as input G; a collation section 3 including an electronic computing circuit and a program for extracting, comparing, and collating electronic digital data on the shape, area, and color from digital data stored in the only one work storage section 1 and the target work storage section 2 and computing the degree of deviation; a reference value storage section 4 including a memory capable of storing sample means and sample variances for populations; a hypothesis test section 5 including a computing circuit and a program for performing a test of hypothesis using the degree of deviation outputted from the collation section 3 using a reference value selected based on a selection signal; and an output section 6 including an output circuit for outputting the result of test obtained by the hypothesis test section 5 as an electronic signal. The system may comprise a transmission circuit for transmitting an electronic signal from the output circuit 6 to an electronic network or the like as required, and a display device connected to the output circuit

6. These only one work storage section 1, target work storage section 2, collation section 3, reference value storage section 4, hypothesis test section 5, and output section 6 can be achieved by one computer and a program or can be achieved by connecting a plurality of computers to each other via an electronic network.

Digital data on only one work and a work to be identified is stored in the only one work storage section 1 and target work storage section 2 as digital data from which information on shape, area, or color is derived. The degree of deviation in the works is calculated by means of the collation section 3 as shape function data in a plurality of divided regions, color data in a plurality of divided regions, and area data in a plurality of divided regions. The test of hypothesis is performed based on the degree of deviation using the sample mean or sample variance. The result of test is outputted to the output section 6, thereby electronically verifying a work.

In the case where an attempt is made to search for a work or signature, the degree of deviation between digital data stored in the target work storage section 2 and all the digital data contained in the storage section 1 is calculated by means of the collation section 3. The calculated degree of deviation is subjected to a test of hypothesis by the hypothesis test section 5. Then, a similar work is electrically searched from the test result, and the result is outputted to the output section 6.

In the present embodiment, it is determined whether or not signature "A" and signature "B" are identical to each other by using three electronic references; shape, area, and color. The respective degrees of deviation are electronically calculated relevant to these three criteria of signature "A" and signature "B", thereby performing identification.

The three references are common in that two signatures are projected in a two-dimensional plane and the projection result of the two signatures is digitized. It is assumed that a difference occurs with projection. A kind of hypothesis test which can be used depends on whether or not the difference caused by the projection follows normal distribution.

In comparing the result obtained by projecting signature "A" onto the two-dimensional plane with the result obtained by projecting signature "B" onto the two-dimensional plane, even if the signatures "A" and "B" are identical to each other, it is difficult to equalize the projection methods or projection conditions. Thus, a difference always occurs with the projection result. The differences are exemplified as follows.

(1) Degradation of Work With an Elapse of Time

Color fading or change of color may occur with a pigment in a picture with the elapse of time after being produced. If projection is performed for the same signature at a different time, a difference occurs in color.

(2) Change of Projection Conditions

Light is prone to reflection and refraction. If there are completely reproduced the state of air at a projection site, the state of the rays of light, color temperature, individual difference in lenses used for projection, a relative position of a projection plane relevant to a signature or the like, a difference occurs with the shape, area, and color of the projection result.

In most cases, even if signature "A" and signature "B" are identical to each other, in simply comparing the projection result of signature "A" with the projection result of signature "B", a difference occurs with the result of projection, thus making it difficult to judge that signature "A", and signature "B" are identical to each other. Therefore, it is difficult to determine that the two signatures "A" and "B" are identical based on a mere comparison result. According to the present invention, it is assumed that the degree of deviation of the two different signatures "A" and "B" is far greater than the degree of deviation of the two signatures which are the same but projected at different conditions.

If the degree of deviation is large, the degree of deviation is distributed over the wide range. It is required that the degree of deviation follows the normal distribution in order to test the large degree of deviation.

If the average of the degree of deviation is large, the degree of deviation is large. The degree of deviation is treated as a distance without the direction (or sign) so that the degree of deviation must be an absolute value. This is because that a positive degree of deviation and a negative degree of deviation are cancelled and the average value thereof becomes zero in spite of a large degree of deviation.

It is possible to determine whether the degree of deviation is based on the projection condition by performing a test of hypothesis using a variance or mean of the degree of deviation. If it is determined that the degree of deviation is based on the projection condition, it can be determined that the signatures "A" and "B" are identical to each other. Otherwise, it can be determined that these signatures "A" and "B" are not identical to each other.

In the present embodiment, although digital data stored in the only one work storage section 1 and target work storage section 2 is defined as image data, and digital data on shape, area, and color is calculated from such image data before computing the degree of deviation, the digital data stored in the only one work storage section 1 and target work storage section 2 may be digital data by which digital data on the shape, area, and color of signature can be calculated without being limited thereto.

For example, as long as digital data stored in the only one work storage section 1 and target work storage section 2 is directed to digital data on the shape, area and color calculated from image data, and the digital data is generated by using a predetermined method, there is no need for the collation section 3 to calculate digital data on shape, area, and color, and the degree of deviation is merely calculated based on the digital data stored in the only one work storage section 1 and target work storage section 2.

Now, computation of the degree of deviation in shape and judgment of identity will be described here.

A certain shape of a signature can be regarded as a set of closed curves, a curve at the contour line of that signature is a closed curve, and this closed curve can be mathematically expressed as a function. This function closely represents the shape of a signature.

Comparing signature "A" with signature "B" indicates comparing the result obtained by projecting signature "A" onto the two-dimensional plane with the result obtained by projecting signature "B" onto the two-dimensional plane.

The function of the closed curve of the signatures "A" and "B" is represented by digital data. Here, the closed curve for each of the signatures "A" and "B" is represented by N number of dots and the dots are interpolated by a parametric spline interpolation. Generally, an arbitral-closed curve can be expressed by a parametric spline interpolation function obtained by a parametric spline interpolation using a parametric variable. The parametric spline function is a $(2M-1)$ order function passing the data points on the predetermined closed curve (M is an arbitrary positive integer).

In order to express an arbitrary closed curve in the X-Y two-dimensional plane by a function, the parametric spline interpolation is performed as follows. The parametric spline interpolation uses a parametric variable t. Thus, the closed curve can be expressed by a smooth function and numerically analyzed such as a differentiation.

N number of data points $(x(t_i), y(t_i))$ (i=0, 1, 2, ... N−1) are positioned on the curve. Here, $(x(t_{N-1}), y(t_{N-1}))=(x(t_0), y(t_0))$. It is assumed that the parameter $t(0 \leq t \leq N-1)$ is $t_i=i$ (i=0, 1, 2, ... N−1). Then, the parametric spline interpolation function is expressed as a first-order combination of a B-spline function. The B-spline function of (K−1)th order is expressed by the following recurrence formula:

$$B_{i,1}(t) = \begin{cases} 1 & (q_i \leq t < q_{i+1}) \\ 0 & (t < q_i, t \geq q_{i+1}) \end{cases}$$

$$B_{i,K}(t) = \frac{t-q_i}{q_{i+K-1}-q_i} B_{i,K-1}(t) + \frac{q_{i+K}-t}{q_{i+K}-q_{i+1}} B_{i+1,K-1}(t)$$

Here, q is a node and can be derived from the value of the data point.

The parametric spline function of (2M−1)th order can be expressed as follows:

$$x(t) = \sum_{i=0}^{N-2} \alpha_{i-M} B^C_{i-M, 2M}(t)$$

$$y(t) = \sum_{i=0}^{N-2} \beta_{i-M} B^C_{i-M, 2M}(t)$$

Here, $$B^C_{i-M, 2M}(t) = \begin{cases} B_{i-M, 2M}(t) + B_{i+N-M-1, 2M}(t) & (0 \leq i \leq M-1) \\ B_{i-M, 2M}(t) & (M \leq i \leq N-M-1) \\ B_{i-M, 2M}(t) + B_{i-N-M+1, 2M}(t) & (N-M \leq i \leq N-2) \end{cases}$$

Coefficients α and β are obtained by inputting the value of the data point to the function.

The degree of deviation between a differential value of Fth order (F is an arbitrary positive integer) of a function representing the closed curve of a signature "A" and that of a signature "B". It is determined using a test of hypothesis whether or not the degree of deviation is based on the projection. Stated another way, it is determined whether the degree of deviation is based on the projection or the degree of deviation is due to the different signatures.

In order to perform the test of hypothesis, the following two hypothesizes are introduced:

(1) $H_0$ (null hypothesis): It is assumed that the degree of deviation is based on the projection.

(2) $H_1$ (alternative hypothesis): It is assumed that the degree of deviation is due to the different signatures.

Population is determined. A significance level and a critical region are determined in accordance with the object of the test, i.e., identification judgment or similar work search. The final result is expressed as follows: If the null hypothesis $H_0$ is rejected with a significance level of 1%, the degree of deviation cannot be said to be the degree of deviation based on the projection with an accuracy of 99% or more. If the null hypothesis $H_0$ is not rejected with a significance level of 1%, the degree of deviation cannot be said not to be the degree of deviation based on the projection.

Figure 2:
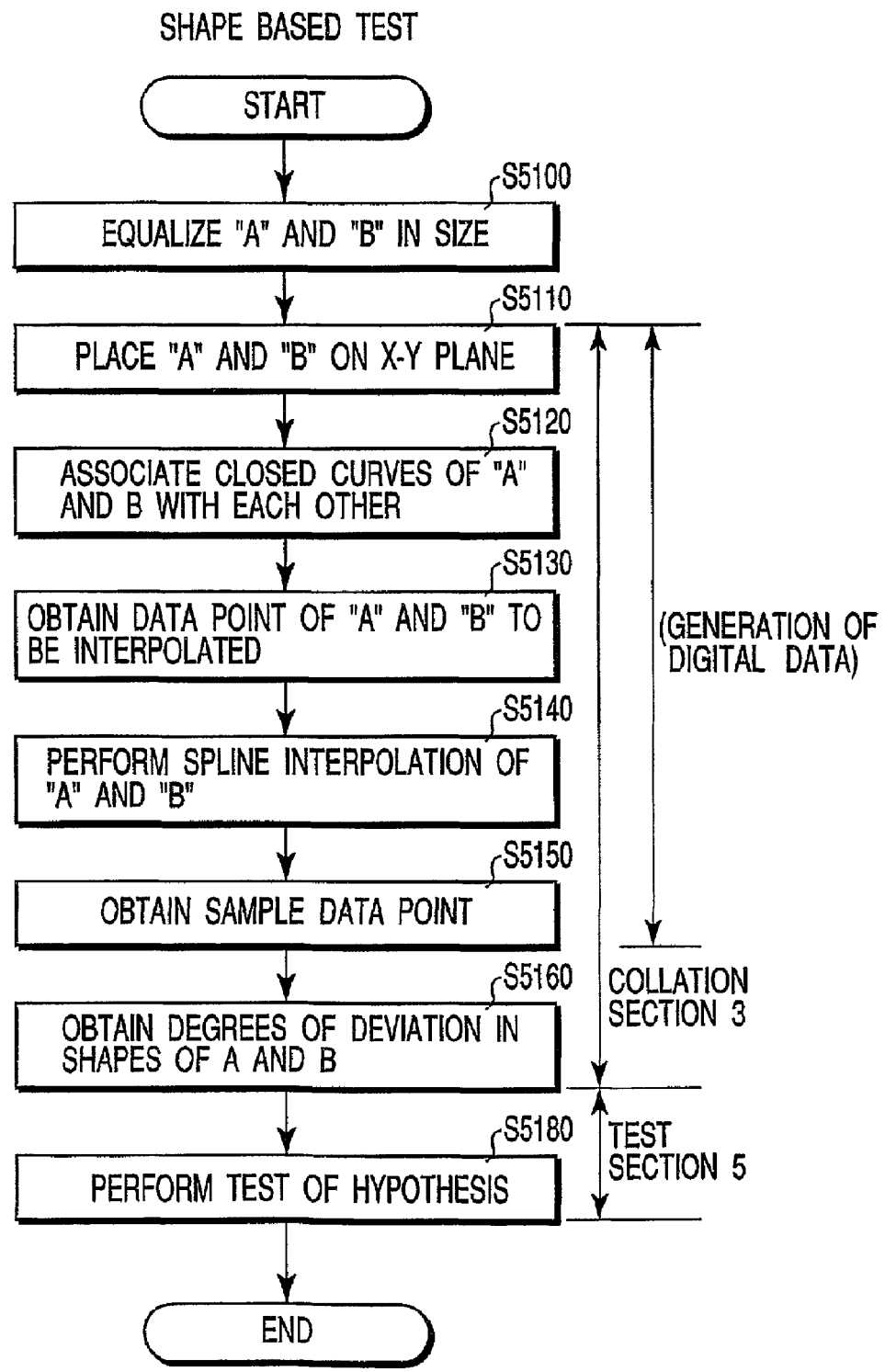
FIG. 2 is a flowchart of an identity judgment procedure based on the forms of signature "A" and signature "B"

FIG. 2 is a flowchart of an identity judgment procedure based on the shapes of signature "A" and signature "B". Steps S5100 to S5160 are performed at the collation section 3, but steps S5100 to S5150 may be performed at the stage of digital data generation. Step S5180 is performed at the hypothesis test section 5.

At step S5100, signature "A" or signature "B" is expanded or contracted so as to make signature "A" and signature "B" comparable with each other by a method for equalizing widths or heights of signature "A" and signature "B" or widths and heights of the signatures, or products of the widths and heights thereof.

At step S5110, a center point $C^{(A)}$ is obtained from the width and height of signature "A". A center point $C^{(B)}$ is obtained from the width and height of signature "B". The $C^{(A)}$ and $C^{(B)}$ are defined as an origin (0, 0) in an X-Y two-dimensional plane, respectively.

At step S5120, D number of closed curves of signature "A" are defined as Ad (d=1, 2, 3, ... D); D number of closed curves of signature "B" that corresponds to Ad are defined as Bd; a closed curve length of the closed curve Ad is defined as $L^{(A)}_d$; and a closed curve length of the closed curve Bd is defined as $L^{(B)}_d$.

Figure 3A:
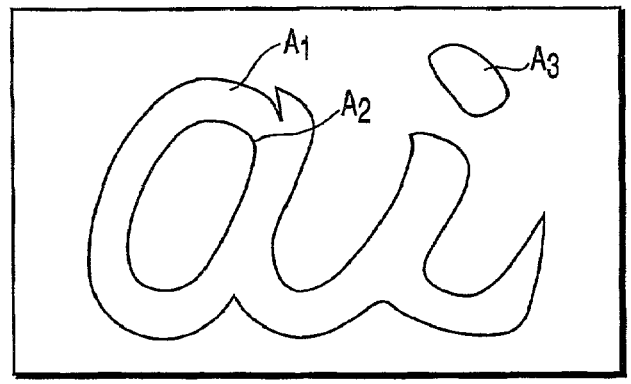
FIG. 3A is a view showing a closed curve Ad that forms a signature.
Figure 3B:
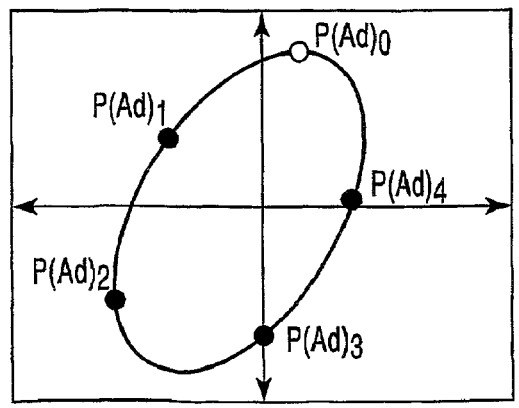
FIG. 3B is a view illustrating a spline interpolation of the closed curve.

An example of dividing a signature of a person "ai" into three closed curves is shown in FIG. 3A. At step S5130, as shown in FIG. 3B, (N+1) number of data points $P^{(Ad)}_i$ (i=0, 1, 2, ... N) are set to equally divide the closed curve length $L^{(A)}_d$ of the closed curve Ad or a total length $\Sigma L^{(A)}_d$ (d=1 to D) of the closed curve Ad. For the sake of simplicity, it is assumed that D=one, i.e., the number of closed curve is one. The coordinate values of the data points $P^{(Ad)}_i$ are represented by $P^{(Ad)}_i=(x(t_i), y(t_i))$ (i=0, 1, 2, ... N). Here, $P^{(Ad)}_N=P^{(Ad)}_0$. The parameter $t(0 \leq t \leq N)$ is defined as $t_i=i$ (i=0, 1, 2, ... N) at data points $P^{(Ad)}_i$ (i=0, 1, 2, ... N).

A point on the closed curve Bd, which is the closest to a start point $P^{(Ad)}_0$ of the closed curve Ad is defined as $P^{(Bd)}_0$. A series of data points $P^{(Bd)}_i$ (i=0, 1, 2, ... N) including $P^{(Bd)}_0$ and which equally divide the length $L^{(B)}_d$ of the closed curve Bd is obtained. The coordinates of the respective points are defined as $P^{(Bd)}_i=(x(t_i), y(t_i))$ (i=0, 1, 2, ... N). Here, $P^{(Bd)}_N=P^{(Bd)}_0$. The parameter $t(0 \leq t \leq N)$ is defined as $t_i=i$ (i=0, 1, 2, ... N) at data points $P^{(Bd)}_i$ (i=0, 1, 2, ... N).

At step S5140, a parametric spline interpolation is performed at (N+1) number of data points $P_i$ (i=0, 1, 2, ... N) to obtain parametric spline interpolation functions is performed x(t) and y(t).

At step S5150, functions of the closed curve Ad are defined as $x^{(Ad)}(t)$, $y^{(Ad)}(t)$, and functions of closed curve Bd are defined as $x^{(Bd)}(t)$, $y^{(Bd)}(t)$. Intervals $t_i \leq t \leq t_{i+1}$ (i=0, 1, 2, ..., N−2) of parameters are equally divided into J, and a parameter $s(0 \leq s \leq N \times J-J)$ is newly taken provided:

$$S_j = \frac{j}{J} (j=0, 1, 2, ... N \times J - J)$$

where $t_i = s_i \times j$ (i=0, 2, 3, ... N−1).

At step S5160, at each $s_j$ (j=0, 1, 2, ... N×J−J·1), the following degree of deviation (distance) at points between closed curve Ad and closed curve Bd is obtained:

$$\Delta L_d(s_j) = \sqrt{(x^{(Bd)}(s_j)-x^{(Ad)}(s_j))^2 + (y^{(Bd)}(s_j)-y^{(Ad)}(s_j))^2}$$

The degree of deviation in 0th order differential value of x(s) and the degree of deviation in 0th order differential value of y(s) are obtained as follows:

$$\Delta x_d(s_j) = x^{(Bd)}(s_j) - x^{(Ad)}(s_j)$$

$$\Delta y_d(s_j) = y^{(Bd)}(s_j) - y^{(Ad)}(s_j)$$

The degree of deviation in first order differential value of x(s) and the degree of deviation in first order differential value of y(s) are obtained as follows:

$$\Delta x_d(s_j) = x^{(Bd)'}(s_j) - x^{(Ad)'}(s_j)$$

$$\Delta y_d(s_j) = y^{(Bd)'}(s_j) - y^{(Ad)'}(s_j)$$

The degree of deviation in second order differential value of x(s) and the degree of deviation in second order differential value of y(s) can be obtained as follows:

$$\Delta x_{d''}(s_j) = x^{(Bd)''}(s_j) - x^{(Ad)''}(s_j)$$

$$\Delta y_{d''}(s_j) = y^{(Bd)''}(s_j) - y^{(Ad)''}(s_j)$$

The degree of deviation in Fth order differential value of x(s) and the degree of deviation in Fth order differential value of y(s) can be obtained as follows:

$$\Delta x_d^{(F)}(s_j) = x^{(Bd)^{(F)}}(s_j) - x^{(Ad)^{(F)}}(s_j)$$

$$\Delta y_d^{(F)}(s_j) = y^{(Bd)^{(F)}}(s_j) - y^{(Ad)^{(F)}}(s_j)$$

The features of the shape of a curve are well represented by the first order differential value.

Thus, the first order differential values are obtained in step S5160.

At step S5180, a test of hypothesis is performed as follows.

(1) The population is defined by the degree of deviations x'(s) and y'(s) for the same signature under the different projection conditions. It is assumed that the population follows the normal distribution.

50 sample points are defined in the signature so that 100 degrees of deviations x'(s) and y'(s) are defined as samples. A sample variance is calculated. It is assumed that the sample variance is 0.0002. The reference value storage section 4 stores the variances for every population, e.g., the shape, area, color, first differential value, etc.. The variance for that population is assumed to be 0.0001 (which is read out from the reference value storage section 4). The test is to determine whether or not the present sample variance 0.0002 is significantly larger than the past variance 0.0001 with the significant level of 1%.

(i) $H_0$ (null hypothesis): $\sigma^2$ (population variance of the degree of deviation)=0.0001.

(ii) $H_1$ (alternative hypothesis): $\sigma^2 > 0.0001$. that the degree of deviation is due to the different signatures.

The critical value of $\sigma^2$ is calculated based on the past sample variance (0.0001), $\chi^2 0.01(99)$ (which is a value of a significant level of 1% under $\chi^2$ distribution with 99 degrees of freedom), and the number of samples (100) as follows:

$$0.0001 \times \chi^2 0.01(99)/(100-1)$$

$$= 0.0001 \times 134.63/99$$

$$= 0.00013$$

Since the present variance 0.0002 is larger than the critical value 0.00013, null hypothesis $H_0$ is rejected. Therefore, it cannot be said that the degree of deviation is based on the projection.

(2) The population is defined by the degree of deviations x'(s) and y'(s) for the same signature under the different projection conditions. It does not matter whether or not the population follows the normal distribution.

50 sample points are defined in the signature so that absolute values of 100 degrees of deviations |x'(s)| and |y'(s)| are defined as samples. A sample mean is calculated. It is assumed that the sample mean of the degrees of deviation of 50 samples is 0.048 and the sample variance of the degrees of deviation of 50 samples is 0.01. The reference value storage section 4 stores the variances and means for every population, e.g., the shape, area, color, first differential value, etc.. The past mean for that population is assumed to be 0.045 (which is read out from the reference value storage section 4). The test is to determine whether or not the mean 0.048 is significantly larger than the past mean 0.045 with the significant level of 1%.

(i) $H_0$ (null hypothesis): $\mu$ (population mean of the degree of deviation)=0.045.

(ii) $H_1$ (alternative hypothesis): $\mu$=0.045.

The critical value of $\mu$ is calculated based on the past mean (0.045), z(0.01) (which is a value of a significant level of 1% under normal distribution), sample variance (0.01), and the number of samples (100) as follows:

$$0.045 + z(0.01) \times (0.01/100)^{1/2}$$

$$= 0.045 + 0.496 \times 0.01$$

$$= 0.04996$$

Since the mean 0.048 is not larger than the critical value 0.04996, null hypothesis $H_0$ is not rejected. Therefore, it cannot be said that the degree of deviation is not based on the projection.

FIG. 2 shows the identity determination. Another example for searching for the similar work will be described.

(1) $H_0$ (null hypothesis): It is assumed that the degree of deviation is due to the different (but similar) signatures of the same author.

(2) $H_1$ (alternative hypothesis): It is assumed that the degree of deviation is significantly larger than the degree of deviation due to the different (but similar) signatures of the same author.

The population is defined by the degree of deviations x'(s) and y'(s) for the similar signatures of the same person.

50 sample points are defined in the signature so that 100 degrees of deviations x'(s) and y'(s) are defined as samples. A sample variance is calculated. It is assumed that the sample variance of the degrees of deviation of 50 samples is 0.121. The past variance for that population is assumed to be 0.1 (which is read out from the reference value storage section 4). The test is to determine whether or not the variance 0.121 is significantly larger than the past variance 0.1 with the significant level of 1%.

(i) $H_0$ (null hypothesis): $\sigma^2$=0.1.

(ii) $H_1$ (alternative hypothesis): $\sigma^2 > 0.1$.

The critical value of $\sigma^2$ is calculated based on the past variance (0.1), $\chi^2 0.01(99)$ (which is a value of a significant level of 1% under $\chi^2$ distribution with 99 degrees of freedom), and the number of samples (100) as follows:

$$0.1 \times \chi^2 0.01(99)/(100-1)$$

$$= 0.1 \times 134.63/99$$

$$= 0.136$$

Since the present variance 0.121 is not larger than the critical value 0.136, null hypothesis $H_0$ is not rejected.

Therefore, it cannot be said that the degree of deviation is not the degree of deviation between two different but similar signatures of the same author.

Now, computation and identification of the degree of deviation in an area will be described.

An area for a signature can be expressed in a number of pixels. Comparing signature "A" and signature "B" denotes comparing an area of the result obtained by projecting signature "A" onto a two-dimensional plane, then further projected onto a pixel plane with an area of the result obtained by projecting signature "B" onto a two-dimensional plane, further similarly projected onto a pixel plane.

Figure 4:
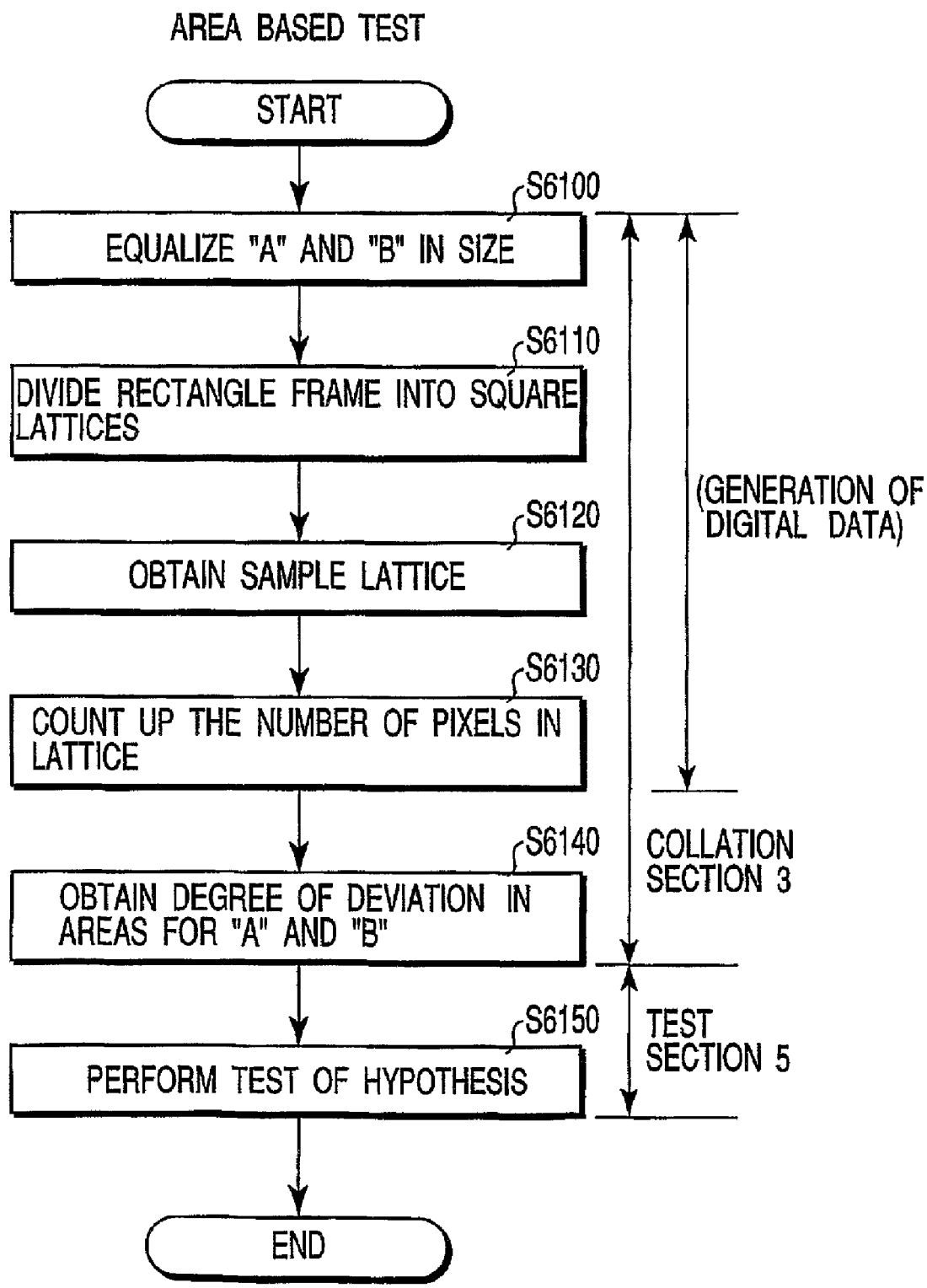
FIG. 4 is a flowchart of an identity judgment procedure based on the areas for signature "A" and signature "B"

FIG. 4 is a flowchart of an electronic identity judgment procedure based on areas for signature "A" and signature "B". Steps S6100 to S6140 are performed at the collation section 3, but steps S6100 to S6130 may be performed at the stage of generating digital data. Step S6150 and step S6160 are performed at the hypothesis test section 5.

At step S6100, signature "A" or signature "B" is enlarged or reduced, thereby making signature "A" and signature "B" comparable with each other using a method for equalizing the widths or heights of signature "A" and signature "B", the widths and heights of the signatures, or, products of the widths and heights thereof.

At step S6110, a frame of a rectangle is generated on a pixel plane, and the frame of the rectangle is divided into L square or rectangle lattices.

At step S6120, when signature "A" and signature "B" are applied to the rectangle frame, numbers 1, 2, 3, ... M are assigned to lattices in which even one pixel exists in the signature "A" or signature "B".

At step S6130, an area of a signature on a lattice m (m=1, 2, 3, ... M) corresponds to the number of pixels of a signature on lattice "m" (m=1, 2, 3, ..., M). The number of pixels of signature "A" on the lattice m (m=1, 2, 3, ... M) is defined as $S_{Am}$ (m=1, 2, 3, ... M), and the number of pixels of signature "B" on the lattice m (m=1, 2, 3, ... M) is defined as $S_{Bm}$ m (m=1, 2, 3, ... M).

At step S6140, the degree of deviation in areas for signature "A" and signature "B" on lattice "m" (m=1, 2, 3, ... M) is calculated by $\Delta S_m = S_{Bm} - S_{Am}$ (m=1, 2, 3, ... M).

At step S6150, a test of hypothesis is performed as follows.

(1) The population is defined by the degree of deviation $\Delta S_m$ for the same signature under the different projection conditions. It is assumed that the population follows the normal distribution.

100 (=10×10) sample points are defined in the signature so that 100 degrees of deviations $\Delta S_m$ are defined as samples. A sample variance is calculated. It is assumed that the sample variance is 0.0015. The past variance for that population is assumed to be 0.0008 (which is read out from the reference value storage section 4). The test is to determine whether or not the present sample variance 0.0015 is significantly larger than the past variance 0.0008 with the significant level of 1%.

(i) $H_0$ (null hypothesis): $\sigma^2 = 0.0008$.
(ii) $H_1$ (alternative hypothesis): $\sigma^2 > 0.0008$.

The critical value of $\sigma^2$ is calculated based on the past variance (0.0008), $\chi^2 0.01(99)$ (which is a value of a significant level of 1% under $\chi^2$ distribution of 99 degrees of freedom), and the number of samples (100) as follows:

$$0.0008 \times \chi^2 0.01(99)/(100-1)$$
$$= 0.0008 \times 134.63/99$$
$$= 0.00109$$

Since the present variance 0.0015 is larger than the critical value 0.00109, null hypothesis $H_0$ is rejected. Therefore, it cannot be said that the degree of deviation is based on the projection.

(2) The population is defined by the absolute value of degree of deviation $|\Delta S_m|$ for the same signature under the different projection conditions. It does not matter whether or not the population follows the normal distribution.

100 (=10×10) sample points are defined in the signature so that 100 degrees of deviations $|\Delta S_m|$ are defined as samples. A sample mean of the degrees of deviation of 100 samples is calculated. It is assumed that the sample mean is 0.048 and the sample variance is 0.01. The past mean for that population is assumed to be 0.045 (which is read out from the reference value storage section 4). The test is to determine whether or not the mean 0.048 is larger than the past mean 0.045 with the significant level of 1%.

(i) $H_0$ (null hypothesis): $\mu = 0.045$.
(ii) $H_1$ (alternative hypothesis): $\mu > 0.045$.

The critical value of $\mu$ is calculated based on the past mean (0.045), z(0.01), sample variance (0.01) and the number of samples (100) as follows:

$$0.045 + z(0.01) \times (0.01/100)^{1/2}$$
$$= 0.045 + 0.496 \times 0.01$$
$$= 0.04996$$

Since the mean 0.048 is larger than the critical value 0.04996, null hypothesis $H_0$ is not rejected. Therefore, it cannot be said that the degree of deviation is not based on the projection.

FIG. 4 shows the identity determination. Another example for searching for the similar work will be described.

(1) $H_0$ (null hypothesis): It is assumed that the degree of deviation is due to the different (but similar) signatures of the same author.

(2) $H_1$ (alternative hypothesis): It is assumed that the degree of deviation is significantly larger than the degree of deviation due to the different (but similar) signatures of the same author.

The population is defined by the degree of deviations $\Delta S_m$ for the similar signatures of the same person.

100 (=10×10) sample points are defined in the signature so that 100 degrees of deviations $\Delta S_m$ are defined as samples. A sample variance of the degrees of deviation of 100 samples is calculated. It is assumed that the sample variance is 0.121. The past variance for that population is assumed to be 0.1 (which is read out from the reference value storage section 4). The test is to determine whether or not the variance 0.121 is larger than the past variance 0.1 with the significant level of 1%.

(i) $H_0$ (null hypothesis): $\sigma^2 = 0.1$.
(ii) $H_1$ (alternative hypothesis): $\sigma^2 > 0.1$.

The critical value of $\sigma^2$ is calculated based on the past variance (0.1), $\chi^2 0.01(99)$, and the number of samples (100) as follows:

$$0.1 + \chi^2 0.01(99)/(100-1)$$
$$= 0.1 + 134.63/99$$
$$= 0.136$$

Since the present sample variance 0.121 is not larger than the critical value 0.136, null hypothesis $H_0$ is not rejected. Therefore, it cannot be said that the degree of deviation is not the degree of deviation of two different but similar signatures of the same author.

Now, computation and identification of the degree of deviation in a color will be described.

The color of a signature can be digitized in a color space. The color spaces include an RGB color space, a CMY(K) color space, an HSL color space or the like. Hereinafter, a description will be given by using a numeric representation of colors in the RGB color space and HSL color space. In the RGB color space, the colors can be numerically expressed with three colors R (red), G (green), and B (blue). Comparing signature "A" and signature "B" denotes comparing a color obtained when the result obtained by projecting signature "A" onto the two-dimensional plane is projected onto a pixel plane with a color obtained when the result obtained by projecting signature "B" onto the two-dimensional plane is projected onto a pixel plane.

Figure 5:
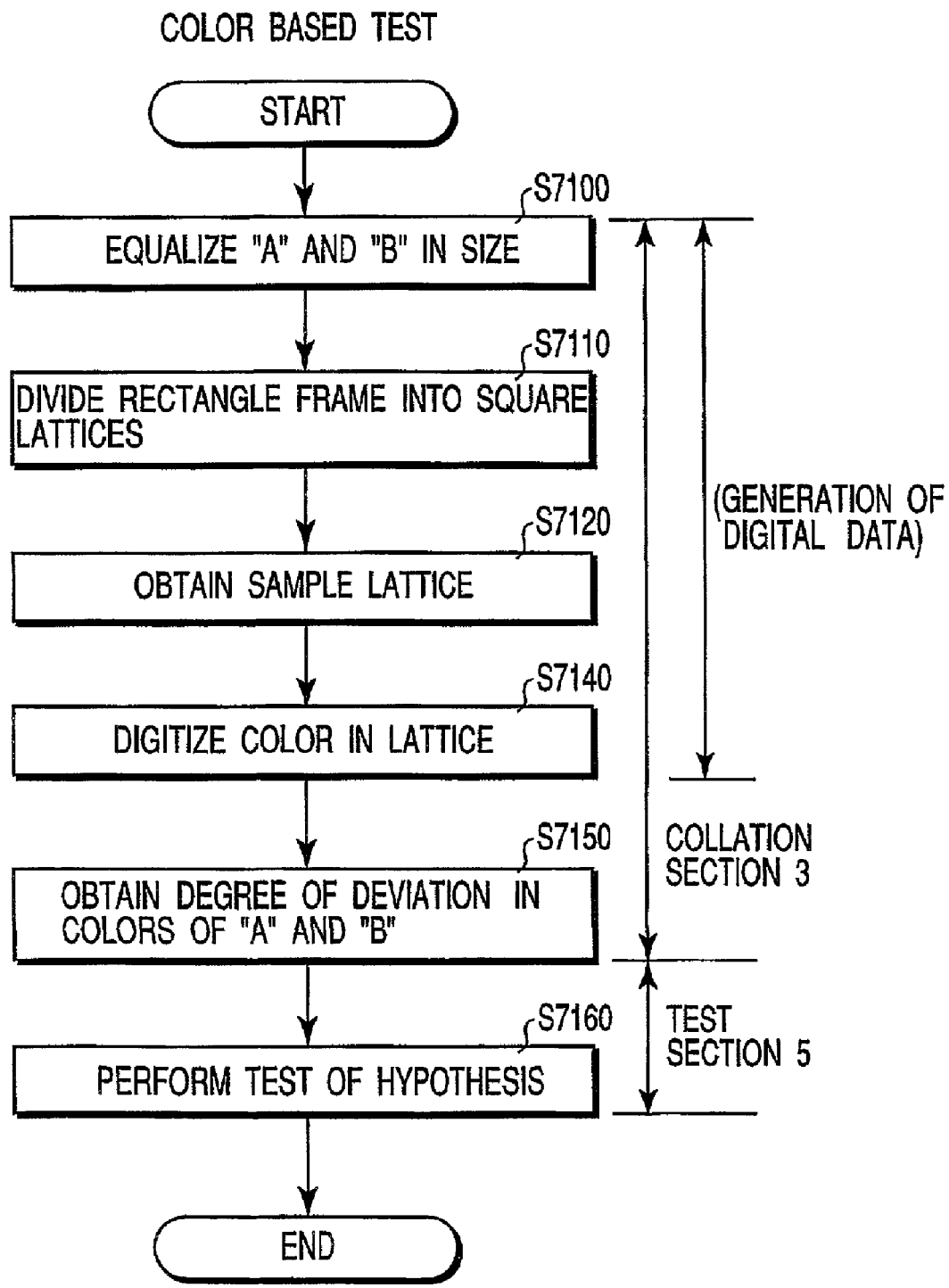
FIG. 5 is a flowchart of an identity judgment procedure based on the colors of signature "A" and signature "B"

FIG. 5 is a flowchart of an identity judgment procedure based on the colors of signature "A" and signature "B". Although steps S7100 to S7150 are performed at the collation section 3, steps S7100 to S7140 may be performed at the stage of generating digital data. Step S7160 is performed at the hypothesis test section 5.

At step S7100, signature "A" or signature "B" is enlarged or reduced, thereby making signature "A" and signature "B" comparable by using a method for equalizing the widths or heights of signature "A" and signature "B" or the widths and heights of the signatures "A" and "B", or, products of the widths and heights thereof.

At step S7110, a frame of a rectangle is generated on a pixel plane, and the frame of the rectangle is divided into L square or rectangle lattices.

At step S7120, when signature "A" and signature "B" are applied to the frame of the rectangle, numbers 1, 2, 3, . . . M are assigned to each lattice in which even one pixel on signature "A" or signature "B" exist.

At step S7140, the colors in a pixel can be numerically expressed with three colors of R (red), G (green), and B (blue). The number of pixels on each lattice m (m=1, 2, 3, . . . M) is defined as N, and numbers mn are assigned to pixels of lattice m (m=1, 2, 3, . . . M).

The colors of a pixel mn is represented by a red numeric value $R_{mn}$, green numeric value $G_{mn}$, and blue numeric value $B_{mn}$. The colors of a lattice m (m=1, . . . M) are represented by the formula below.

$$R_m = \frac{\sum_{n=1}^{N} R_{nm}}{N}, G_m = \frac{\sum_{n=1}^{N} G_{nm}}{N}, B_m = \frac{\sum_{n=1}^{N} B_{nm}}{N}$$

Although the colors of m'n' other than signatures can be used intact, they may be defined as $R_{m'n'}=G_{m'n'}=B_{m'n'}=K$ (constant), where the constant K is mainly used as "0", a "possible minimum value", a "possible maximum value", a "possible intermediate value", or a "value representing a gray at a reflection index of about 18%".

The colors of signature "A" on lattice m (m=1, 2, 3, . . . M) are defined as $R_{Am}$, $G_{Am}$, and $B_{Am}$ (m=1, 2, 3, . . . M), and the colors of signature "B" on lattice m (m=1, 2, 3, . . . M) are defined as $R_{Bm}$, $G_{Bm}$, and $B_{Bm}$ (m=1, 2, 3, . . . M).

At step S7150, the degrees of deviation in colors of signature "A" and signature "B" on lattice m (m=1, 2, 3, . . . M) are obtained as follows:

$$\Delta R_m = R_{Bm} - R_{Am},$$

$$\Delta G_m = G_{Bm} - G_{Am},$$

$$\Delta B_m = B_{Bm} - B_{Am}$$

At step S7160, a test of hypothesis is performed as follows.

(1) The population is defined by the degree of deviation $\Delta R_m$ in the R value of the RGB color model for the same signature under the different projection conditions $J_A$ and $J_B$. It is assumed that the population follows the normal distribution. The value of R is ranging from 0 to 255.

(i) Without preliminary compensation for color value

In the past experiences, it is known that the red value becomes large due to the color deviation of the lens under the projection conditions $J_B$. The past mean and variance are −10 and 2 (which are read out from the reference value storage section 4). 100 (=10×10) sample points are defined in the signature so that 100 degrees of deviations are defined as samples. A sample variance is calculated. It is assumed that the sample variance is 3 with the mean −10 being known. The test is to determine whether or not the sample variance 3 is significantly larger than the past variance 2 with the significant level of 1%.

(a) $H_0$ (null hypothesis): $\sigma^2=2$.

(b) $H_1$ (alternative hypothesis): $\sigma^2>2$.

The critical value of $\sigma^2$ is calculated based on the past variance (2), $\chi^2 0.01(100)$ (which is a value of a significant level of 1% under $\chi^2$ distribution of 100 degrees of freedom), and the number of samples (100) as follows:

$$2 \times \chi^2 0.01(100)/100 = 2 \times 135.8/100$$
$$= 2.7$$

Since the present variance 3 is larger than the critical value 2.7, null hypothesis $H_0$ is rejected. Therefore, it cannot be said that the degree of deviation is based on the projection.

(ii) With preliminary compensation for color value

In the past experiences, it is known that the red value becomes large due to a lower color temperature under the projection conditions $J_B$. The red value can be compensated for as follows.

$$R_{Bm}' = (R_{Bm}/255)^{1.5} \times 255$$

After the red values $R_{Bm}$ are amended to $R_{Bm}'$, the test can be performed on the assumption that the projection conditions $J_A$ and $J_B$ are identical to each other.

(2) The population is defined by an absolute value of the degree of deviation $|\Delta R_m|$ in the R value of the RGB color model for the same signature under the different projection conditions $J_A$ and $J_B$. It does not matter whether or not the population follows the normal distribution.

In the past experiences, it is known that the red value becomes large due to the color deviation of the lens under the projection conditions $J_B$. The red value can be compensated for as follows.

$$R_{Bm}' = (R_{Bm}/255)^{1.5} \times 255$$

After the red values $R_{Bm}$ are amended to $R_{Bm}'$, the test can be performed on the assumption that the projection conditions $J_A$ and $J_B$ are identical to each other. 100 (=10×10) sample points are defined in the signature so that 100 degrees of deviations are defined as samples. A sample mean is calculated. It is assumed that the sample mean is 0.12. The past mean and variance for that population are assumed to be 0.1 and 1 (which are read out from the reference value storage section 4). The test is to determine whether or not the present sample mean 0.12 is larger than the past mean 0.1 with the significant level of 1%.

(a) $H_0$ (null hypothesis): $\mu=0.1$.
(b) $H_1$ (alternative hypothesis): $\mu>0.1$.

The critical value of $\mu$ is calculated based on the past mean (0.1), z(0.01), and the number of samples (100) as follows:

$$0.1 + z(0.01) \times (1/100)^{1/2} = 0.1 + 0.496 \times 0.1$$
$$= 0.1496$$

Since the present mean 0.12 is not larger than the critical value 0.1796, null hypothesis $H_0$ is not rejected. Therefore, it cannot be said that the degree of deviation is not based on the projection.

(3) The population is defined by an absolute value of the degree of deviation $|\Delta S_m|$ in the S value of the HSL color model (H (hue), S (saturation), and L (lightness)) for the same signature under the different projection conditions $J_A$ and $J_B$. The S value is ranging from 0 to 100.

In the past experiences, it is known that the S value becomes small due to 100-year aging under the projection conditions $J_B$. The S value can be compensated for as follows.

$$S_{Am}' = \min\{0, S_{Am}-10\}$$

After the S values $S_{Am}$ are amended to $S_{Am}'$, the test can be performed on the assumption that the projection conditions $J_A$ and $J_B$ are identical to each other.

100 (=10×10) sample points are defined in the signature so that 100 degrees of deviations are defined as samples. A sample mean is calculated. It is assumed that the sample mean is 0.12 and the sample variance is 1. The past mean for that population is assumed to be 0.1 (which is read out from the reference value storage section 4). The test is to determine whether or not the present sample mean 0.12 is larger than the past mean 0.1 with the significant level of 1%.

(a) $H_0$ (null hypothesis): $\mu=0.1$.
(b) $H_1$ (alternative hypothesis): $\mu>0.1$.

The critical value of $\mu$ is calculated based on the past mean (0.1), z(0.01), sample variance(1) and the number of samples (100) as follows:

$$0.1 + z(0.01) \times (1/100)^{1/2} = 0.1 + 0.496 \times 0.1$$
$$= 0.1496$$

Since the present mean 0.12 is not larger than the critical value 0.1496, null hypothesis $H_0$ is not rejected. Therefore, it cannot be said that the degree of deviation is not based on the projection.

FIG. 5 shows the identity determination. Another example for searching for the similar work will be described.

(1) $H_0$ (null hypothesis): It is assumed that the degree of deviation is due to the different (but similar) signatures of the same author.

(2) $H_1$ (alternative hypothesis): It is assumed that the degree of deviation is significantly larger than the degree of deviation due to the different (but similar) signatures of the same author.

The population is defined by the degree of deviations $\Delta S_m$ for the similar signatures of the same person.

100 (=10×10) sample points are defined in the signature so that 100 degrees of deviations $\Delta S_m$ are defined as samples. A sample variance of the degrees of deviation of 100 samples is calculated. It is assumed that the sample variance is 0.121. The past variance for that population is assumed to be 0.1 (which is read out from the reference value storage section 4). The test is to determine whether or not the variance 0.121 is larger than the past variance 0.1 with the significant level of 1%.

(i) $H_0$ (null hypothesis): $\sigma^2=0.1$.
(ii) $H_1$ (alternative hypothesis): $\sigma^2>0.1$.

The critical value of $\sigma^2$ is calculated based on the past variance (0.1), $\chi^2 0.01(99)$, and the number of samples (100) as follows:

$$0.1 + x^2 0.01(99)/(100-1) = 0.1 + 134.63/99$$
$$= 0.136$$

Since the present sample variance 0.121 is not larger than the critical value 0.136, null hypothesis $H_0$ is not rejected. Therefore, it cannot be said that the degree of deviation is not the degree of deviation of two different but similar signatures of the same author.

In the present embodiment, the precision of judgment can be increased by properly combining these judgments without being limited to single judgments of the above described shape, area, and color.

The present embodiment is applicable in any of the cases below.

(1) Work identification by judging identity of a signature

The uniqueness or originality of a work is characterized in that it can be verified by the signature, of which there is only one. The signature of work "A" is registered in advance as a result of projection onto a two-dimensional plane, and the signature of work "B" is examined with the result of the projection into the two-dimensional plane relevant to the shape, area, and color, thereby making it possible to electronically judge whether or not the work "A" and the work "B" are identical to each other.

(2) Work identification by judging identity of shape

A work is characterized by the form of its surface, represented by depressions, thus usable in verification of its creator. Work "A" is registered in advance as a result of projection onto a two-dimensional plane, and work "B" is examined with the result of projection onto the two-dimensional plane relevant to the shape, area, and color, thereby making it possible to electronically judge whether or not the work "A" and the work "B" are identical to each other.

In addition, a plurality of cross sections of a depression are projected onto the two-dimensional plane, thereby making it possible to obtain a closed curve that represents the shape of the depression for each cross section. As in the above embodiment, the works are examined relevant to the shape and area, thereby making it possible to electronically judge whether or not the work "A" and the work "B" are identical to each other.

Parametric spline interpolation used in the above embodiment is applicable to a three-dimensional space as in the two-dimensional space. Work "A" is registered in advance as a result of projection onto a three-dimensional plane, and work "B" is examined with the result of projection onto the three-dimensional plane relevant to the shape, area, and color, thereby making it possible to electronically judge whether or not the work "A" and the work "B" are identical to each other.

(3) Work identification by judging the identity of pictures and photographs

In most cases, the works of pictures or photographs are rectangular in shape, thus making it difficult to characterize, by its shape or area, that the work is the only one work. However, it is characterized by the distribution of colors as to whether or not that work is only one. Work "A" is registered in advance as a result of projection onto a two-dimensional plane, and work "B" is examined with the result of projection onto the two-dimensional plane relevant to the color, thereby making it possible to electronically judge whether or not the work "A" and the work "B" are identical to each other.

(4) Searching the author's name from an image of the work

The correlation of identity is performed by using the projection result of an unspecified number of works registered in advance and the result of projection of a work whose author's name is to be searched, thereby a similar work can be searched. This enables to search by defining an image itself as a key instead of search by defining a character string as a key.

A work identity judgment system according to the present embodiment comprises a storage section which stores digital data on only one work; a target storage section which stores digital data on a work to be identified; a collation section which collates digital data stored in the storage section and the target storage section to obtain a degree of deviation; a reference value storage section which stores reference values for test of hypothesis; and a test section which performs test of hypothesis based on the degree of deviation and the reference value. The digital data is the projection result of only one work and a work to be identified. The degree of deviation is calculated by defining the projection result as function data in the shape in a plurality of regions. The test of hypothesis is performed to determine whether the degree of deviation is based on the projection condition or is the degree of deviation of two different signatures, thereby judging the identity of the work. Further, it is possible to search for a similar work if the work to be identified is compared with plural only one works. The shape of the signature or the work is stored as digital data, and the difference is digitized, thereby making it possible to electronically judge the identity of the work.

The degree of deviation can be calculated by defining the digital data as color data in a plurality of regions, whereby the judgment of identity of work can be performed based on color.

The degree of deviation can be calculated by defining the digital data as area data in a plurality of regions, whereby the judgment of identity of work can be performed based on area.

It is possible to freely select at least one of the degrees of deviation in the shape, area, and color depending on the type of the work to be identified.

A reference value (significant level for critical region) is selected for the degree of deviation in color in consideration of color fading or change of color, whereby the judgment of identity of a work can be performed more precisely.

Identification can be performed as long there is only one work, the work being characterized by its shape, color, or area or a combination thereof.

In addition, when there exists an unspecified number of N signatures "A1", ... "AN" and one signature "B", the degree of deviation in each of the shape, area, and color of the signatures "Ai" (i=1, ... M) and "B" is obtained, and test of hypothesis is performed N times, whereby a signature similar to "B" can be searched from among "Ai" (i=1 ... N).

Other embodiments of the present invention will be described. In the following embodiments, like elements corresponding to those in the first embodiment are designated by the same reference numbers and the detailed description thereof is omitted.

Second Embodiment

When an author or owner approves use of one's digitized work by the other person, the author or owner may approve it by including signature insertion.

A digitized signature is stored in a signature database, whereby, if the author or owner approves use of such a digitized work, the signature can be electronically inserted into a work, e.g., through an electronic network, and the signed work can be distributed, e.g., through an electronic network, making it possible to prevent use of a digitized work into which no signature is inserted.

For example, assume that one photographer does not want to insert his or her signature into a negative or positive film that is an original of a work, but wants to insert his or her signature when that work is used for advertisement. Assume that the photographer's signature is produced as digital data, the signature is stored in a signature storage section, and a work is digitized, and is stored in a work storage section. When one advertisement company searches for a digitized work stored in the work storage section through an electronic network, such as Internet, a decision was made to use the photographer's work. When the advertisement company specifies a signature insertion position at a lower right so as not to compete with the layout of an advertisement statement, a digitized work into which the photographer's signature is inserted at the lower right by means of a signature insertion section is distributed to the advertisement company.

In addition, when the author or owner approves use of the digitized work, he or she may approve it including insertion of a signature into a position of the signature in harmony with the work, specified by the author or owner.

When a digitized signature is stored in the signature storage section or when a digitized work is stored in the signature storage section, the insertion position of the signature approved in advance as well is stored, whereby the signature position desired by the author, owner or user can be electronically determined, thus making it possible to prevent from inserting a signature into a digitized work at a position that is not desired by the author or owner.

For example, assume that a photographer had determined that a work and a signature are most harmonized when the signature is inserted at the bottom right from the center of the work. When the digitized work is stored in the work storage section, four possible signature insertion positions are stored. An advertisement company who wants to use a work can select a signature position that is not competed with the layout of an advertisement statement from such four signature positions.

Alternately, when an author or owner approves use of a digitized work, the author or owner may approve it including use of the work for the purpose of use suitable to the work, which is specified by the author or owner. When the digitized signature is stored in the signature storage section or when the digitized work is stored in the signature storage section, the purpose of use of the work approved in advance as well is stored, whereby the purpose of use of the work desired by the author, owner, and user can be electronically determined, thus making it possible to prevent use of the work for a purpose that is not desired by the author or owner.

For example, assume that a photographer wants to approve only use for academic purpose. When a digitized work is stored in the work storage section, an academic purpose as well is stored as a purpose of use of a work approved in advance. A publishing company who wants to use the work attempts to use it for production of educational matters, and can use the photographer's work.

When the digitized work is used for printing, advertisement, publishing, homepage, distribution, sales, exhibition, computer software installation or the like, the digitized signature is electronically inserted in the digitized work, whereby an unspecified number of work authors and an unspecified number of users can insert their signatures into the work, approve use of the work, and distribute the work in consideration of their desires.

In a work, one wants to specify the author or owner of the work from the signature of the work or work itself.

By storing a digitized signature in the signature storage section or by storing a digitized work in the work storage section, when the author or owner is unknown by referring to the work or signature, the author's name or owner's name can be searched from the digitized signature or digitized work by the signature search section or the work search section.

For example, assume that a landscape photograph is used for a poster. If that photograph has an author's signature, and the signature is stored in the signature storage section, when a person who likes that work by referring to it digitizes a signature portion by means of a scanner, and transmits it to the signature search section through the Internet, the name of the photographer using that signature is transmitted as a result of the search. The author of the desired work can be known by electronically searching for the author of the work.

In addition, assume that an oil painting is used in publishing matter. If a museum's signature is inserted into that work, and the museum's signature is stored in the signature storage section, when a person who likes the work by referring to it digitizes a signature portion by means of a scanner, and transmits it to the signature search section through the Internet, the name of the museum using that signature is transmitted as a result of search. The owner of the work is electronically searched, whereby the person can know the museum that owns the work in order to actually appreciate the work.

The author or owner of the work is electronically specified, whereby appreciation of works such as pictures or photographs can be easily made popular.

One wants to identify the author of a work.

A signature that is a part of the work is digitized and stored in the signature storage section or a digitized work is stored in the work storage section, whereby, when an attempt is made to identify the author of the work, the author can be electronically identified from the signature or work by means of a signature identification section or a work identification section.

For example, assume that a famous painter's oil painting has been introduced in an auction. Assume that the painter stored his or her signature in the signature storage section when the work was produced. Although the painter died 200 years ago and it is difficult to identify whether or not the introduced work is the painter's work, when an auction company photographs the signature of the work by means of a digital camera, and transmits it to the signature identification section through the Internet, the result of the identification electronically performed is transmitted.

When it is necessary to identify the author of the work by trading, leasing, donation, exchange or the like, represented by auction, if a digitized signature is stored in the signature storage section, the signature of the work to be identified is electronically compared with the signature stored in the signature storage section, thereby making it possible to precisely judge the author of the work.

Now, the terms used in the present embodiment will be described here.

Work: A work is produced by an author, and is associated with only one work when no identical works exist. The works include paintings, photographs, block prints, pasted pictures, sculptures, statues, pots, earthenware, and calligraphy or the like.

Projection: Converting information on one space to information on another space. For example, projecting an object in a three-dimensional space by an analogue camera denotes projecting into a two-dimensional plane on a film. Projecting an object in a three-dimensional space by a digital camera or scanner denotes projecting into a pixel plane that is a two-dimensional plane. Projecting a cross section of an object in a three-dimensional space denotes projecting into a two-dimensional plane. Projecting into a three-dimensional space is possible by projecting the cross section of an object in a three-dimensional space a plurality of times. An object in a three-dimensional space is projected at a variety of angles, thereby enabling to project into the three-dimensional space. Expressing an object in a three-dimensional space as a two-dimensional function denotes projecting into a two-dimensional plane. Expressing an object in a three-dimensional space denotes projecting into a three-dimensional space. Expressing data in the two-dimensional pixel plane as a two-dimensional function denotes projecting into a two-dimensional plane.

Digital Data: Digitized information. Images in a pixel plane, points, functions or the like in a two-dimensional plane are exemplified, but not limited thereto, and information expressed by a combination of numerals can be employed.

Electronic Work: An electronic work is directed to a work converted into digital data by projecting a work. A work produced by using graphic software or the like originally corresponds to digital data and an electronic work. A work in which an electronic work is projected to be converted into digital data corresponds to an electronic work. When an electronic work is stored in the work storage section, the use of a work into which a signature is inserted can be approved by an unspecified number of customers, thereby making it possible to identify an author by electronically judging the identity of a work using the work identification section or to specify an author by electronic search for a work using the work search section.

Signature: A signature in a work such as picture or photograph is a set of closed curves instead of a combination of open curves, and has a shape, an area, and a color in a portion enclosed in the closed curves.

Customer (user, searcher, or identification requester): A customer is directed to a user who uses an electronic work for printing, advertisement, publishing, homepage, distribution, sales, exhibition, computer software installation or the like, a searcher who wants to specify an author or owner from signature or work, or an identification requester who requests identification when it is necessary to identify the author of the work by trading, leasing, donation, exchange or the like, by auction.

Independent Signature: This signature is independent of a work, and is defined as an independent signature to be inserted into an electronic work without being inserted into the work itself. Mainly, this signature is of an individual that is the author or an organization such as museum, picture gallery, company that is the owner.

Electronic Independent Signature: This signature is provided by projecting an independent signature, thereby converting it into digital data. Alternatively, this signature is directed to an independent signature produced as digital data in advance. In the case where an author or owner wants to insert an independent signature into a work when an electronic work is used for printing, advertisement, publishing, homepages, distribution, sales, exhibition, computer software installation or the like, the electronic independent signature is stored in the independent signature storage section so that the electronic work into which the electronic independent signature is inserted by the signature insertion section can be distributed to a user. This makes it possible to specify an author or owner through electronic search using the signature search section or to identify the author by electronically judging the identity of signature using the signature identification section.

Signature Position: This position denotes a position at which an electronic independent signature on an electronic work is inserted when the electronic independent signature is inserted into an electronic work. An electronic independent signature is independent of an electronic work, and thus, the electronic independent signature can be inserted at a preferred position when the electronic work is used. The author or owner approves the signature position. A signature position approval section electronically performs approval.

Work Use Purpose: A purpose of use of an electronic work. The use purpose of a work is approved by an author or owner. A work use purpose approval section electronically performs approval.

Specific Signature: A signature to be inserted into a work by an author by overwriting, engraving, pasting, embedding, burning, and dissolving or the like is defined as a specific signature. This specific signature corresponds to a work one by one. If a work is by the same person, such a work exists in the form of only one work in which the same signature does not exist. Thus, this specific signature can be used to judge the identity of only one work. Although a painter often inserts a date and an author's signature when he or she completes oil painting, this is an example of specific signature. In the case of photographs, there are many works in which such a specific signature is not performed.

Electronic Specific Signature: This signature is provided by projecting a specific signature, thereby converting it into digital data. The electronic specific signature is stored in the specific signature storage section, thereby making it possible to identify an author by electronically judging the identity of a signature using the signature identification section or to specify an author by an electronic search for a signature using the signature search section.

Electronic Network: An electronic network mainly denotes the Internet. In addition to the Internet, this network includes a wired or wireless information transmission section such as LAN, WAN, wireless LAN, an information transmission medium such as hard disk, memory, floppy disk, CD, MO, IC card or the like, and a digital data information transmission section including an information transmission section such as a signal transfer path, represented by a bus generally installed between computer hardware components.

Signature storage Section, Work Storage Section: A signature storage section and a work storage section store signature and work digital data by utilizing computer hardware or software. For example, when a hard disk or CD, memory, or IC card is used, an electronic signature or electronic work can be stored.

Electronic Signature storage Company: This company has an electronic signature management system capable of storing an electronic signature, electronically inserting a signature into a work, distributing an electronically signed electronic work, electronically approving use of the work, and electronically specifying an author or owner of the work.

Hereinafter, a second embodiment of the present invention will be described in detail.

Figure 6:
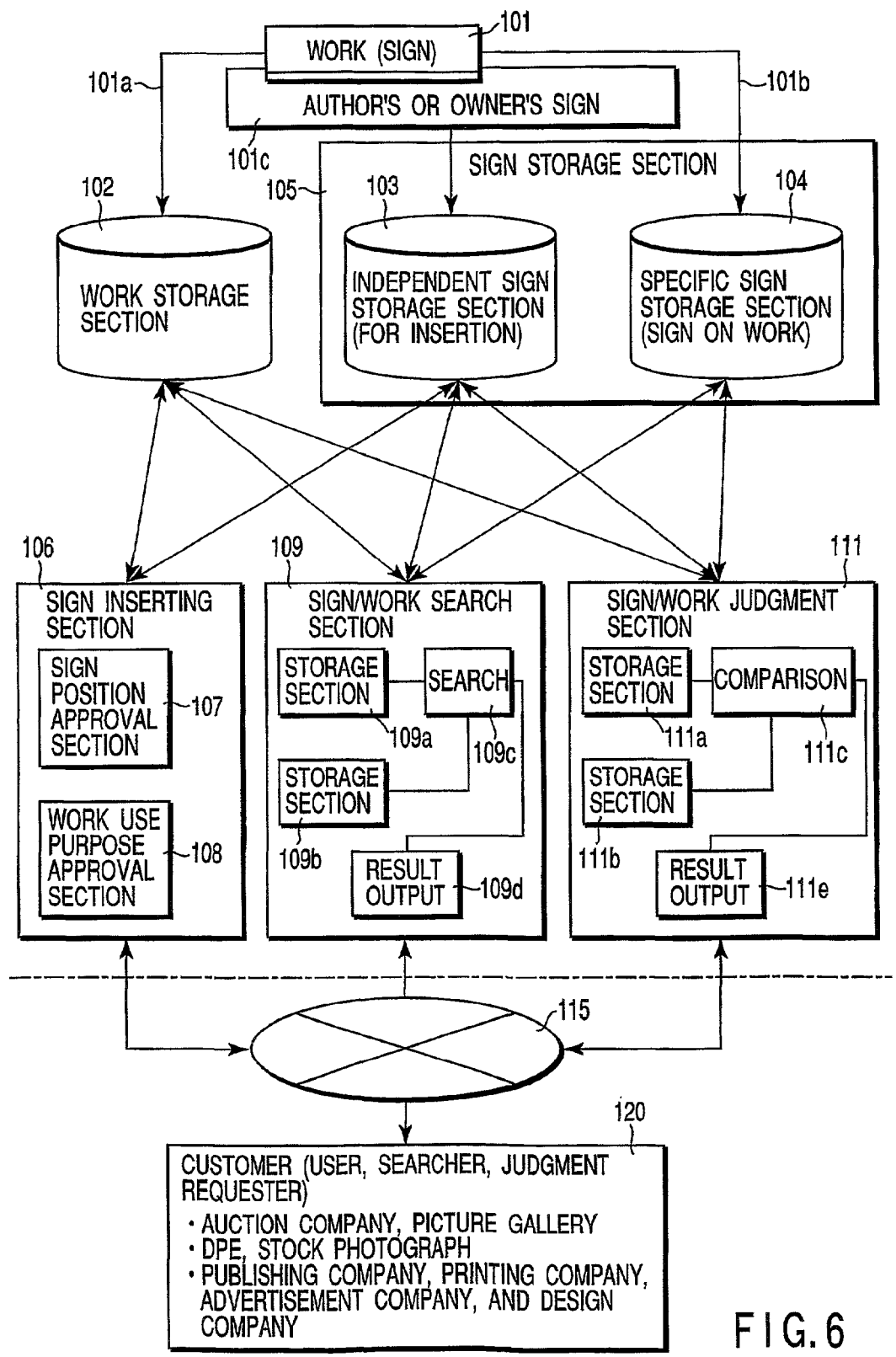
FIG. 6 is a block diagram of a basic configuration of a work signature management system according to a second embodiment of the present invention.

FIG. 6 is a block diagram depicting a basic configuration of a work signature management system according to the present invention. A work 101 produced by an author is defined as a digitized electronic work 101a. In addition, a specific signature extracted from a part of the work is defined as a digitized electronic specific signature 101b. The former is stored in a work storage section 102 including a storage device. The latter is stored in a specific signature storage section 104 including a storage device. On the other hand, an independent signature produced by an author or owner is defined as an electronic independent signature 101c, and is stored in an independent signature storage section 103 including a storage device. A signature storage section 105 includes the independent signature storage section 103 and specific signature storage section 104.

A signature insertion section 106 generally composed of computer hardware and software includes a signature position approval section 107 and a work use purpose approval section 108. An electronic independent signature received from the independent signature storage section 103 is inserted into a properly approved position on an electronic work received from the work storage section 102 by approval of the work use purpose approval section 108 and by approval of the signature position approval section 107.

A signature/work search section 109 generally composed of computer hardware and software basically operates as a signature search section and a work search section. The signature search section searches for a similar signature from the electronic signatures stored in the independent signature storage section 103 and specific signature storage section 104. The work search section searches for a similar work from the electronic works stored in the work storage section 102.

A signature/work identification section 111 generally composed of computer hardware and software basically operates a signature identification section and a work identification section. The signature identification section compares digital data on signatures stored in the independent signature storage section 103 and specific signature storage section 104 with digital data on a signature to be identified, thereby judging the identity. The work identification section compares an electronic work stored in the work storage section 102 with an electronic work to be identified, thereby judging the identity.

These work storage section 102, independent signature storage section 103, and specific signature storage section 104 are indirectly connected to a customer's electronic system 120 through the signature insertion section 106, signature/work search section 109, and signature/work identification section 111, The signature insertion section 106, signature/work search section 109, and signature/work identification section 111 are directly connected to the customer's electronic system 120 through an electronic network 115 such as the Internet. In this manner, the result is transmitted through the electronic network 115 according to the customer's order through the electronic network 115.

The arrow of FIG. 6 indicates information transmission. In addition, in this example, the area above the dotted line denotes an electronic signature storage company's system.

The signature/work search section 109 comprises a storage section 109a which stores data from the work storage section 102, independent signature storage section 103, and specific signature storage section 104; a storage section 109b which stores digital data or condition data on a signature or work sent from a customer; a search section 109c which makes search based on the digital data or condition data on these signatures or works; and a result output section 109d which outputs the search result.

The signature/work identification section 111 comprises a storage section 111a which stores digital data from the work storage section 102, independent signature storage section 103, and specific signature storage section 104; a storage section 111b which stores digital data on a signature/work to be identified, sent from a customer; a comparison section 111c which compares these data; and a result output section 111e which outputs the identification result. Although only essential parts of the signature/work identification section 111 have been described, this section may be identical to that of the work identification system according to the first embodiment shown in FIG. 1.

Figure 7A:
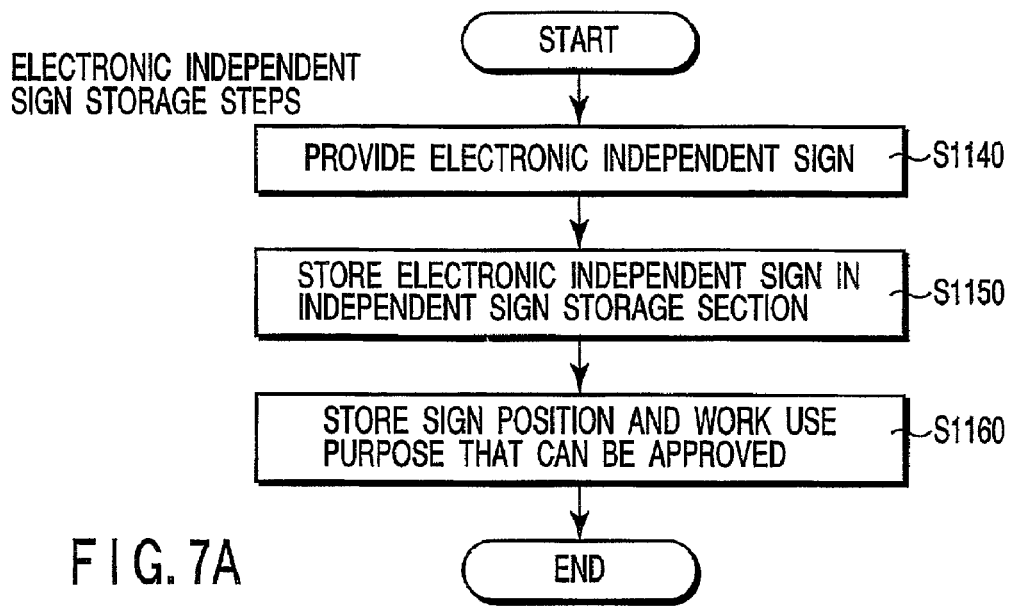
FIG. 7A is a flowchart of the steps for storing an electronic independent signature according to the second embodiment.
Figure 7B:
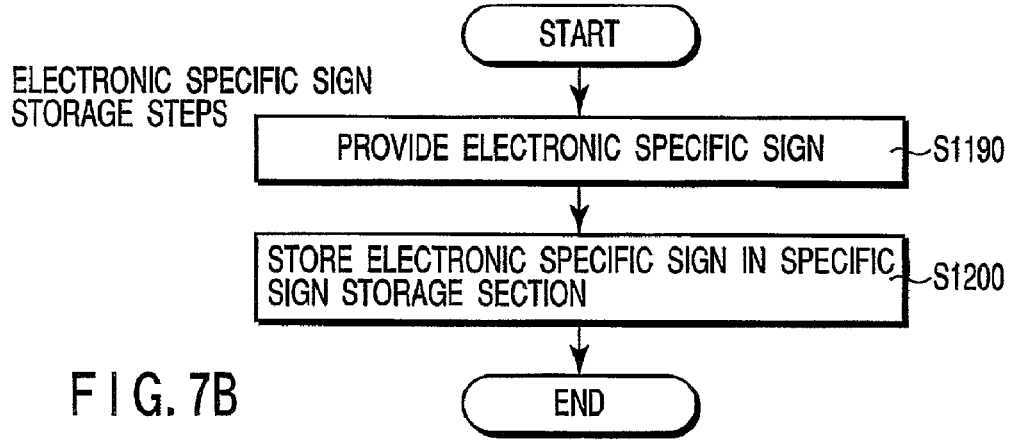
FIG. 7B is a flowchart of the steps for storing an electronic specific signature according to the second embodiment.
Figure 7C:
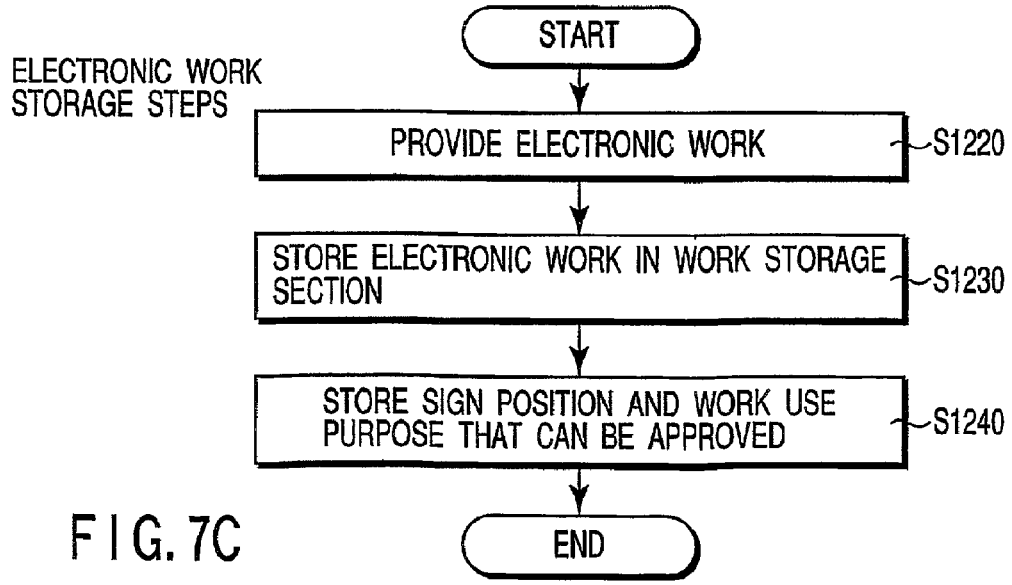
FIG. 7C is a flowchart of the steps for storing an electronic work according to the second embodiment.

Now, the storage steps will be described in accordance with a flowchart of the signature/work storage steps shown in FIG. 7A to FIG. 7C. FIG. 7A is a flowchart showing the electronic independent signature storage steps; FIG. 7B is a flowchart showing the electronic specific signature storage steps; and FIG. 7C is a flowchart showing the electronic work storage steps.

At step S1140 shown in FIG. 7A, when an electronic work 101a is distributed through the electronic network 115, in the case where a signature position on the electronic work 101a is determined, and an electronic independent signature 101c is inserted into the signature position or in the case where an attempt is made to search or identify an author or owner from the electronic independent signature 101c the electronic independent signature 101 is provided.

At step S1150, the electronic independent signature 101c is stored in the independent signature storage section 103. In this manner, when an electronic work 101a is distributed through the electronic network 115, the signature position on the electronic work 101a is determined, whereby an electronic work into which the electronic independent signature 101c is inserted at the signature position can be distributed, thus making it possible to prevent an electronic work into which no electronic independent signature 101c is inserted from being used. In addition, when a searcher searches the electronic independent signature 101c, information on author's name is obtained. In addition, when an identification requester makes a request for identification of an independent signature, the identity can be collated precisely.

At step S1160, when the electronic independent signature 101c is stored in the independent signature storage section 103, even in the case where the electronic work 101a is not stored in the work storage section 102, some signature positions or work use purposes can be stored with prior approval common to all the electronic works 101a in order to specify a signature position or a work use purpose. In addition, an approval for use of the electronic work 101a can be done through the electronic network 115 including a signature position or work use purpose.

At step S1190 shown in FIG. 7B, in the case where an attempt is made to precisely identify an author by a signature or in the case where an attempt is made to search or identify an author, an electronic specific signature is provided.

At step S1200, the electronic specific signature 101b is stored in the specific signature storage section 104. In this manner, when the identification requester makes a request for identification of a specific signature through the electronic network 115, the identity of the specific signature can be determined precisely. In addition, when the searcher searches the electronic specific signature 101b, information on the author's name or title of the work is obtained.

At step S1220 shown in FIG. 7C, in the case where the electronic work 101a into which the electronic independent signature 101c is inserted is stored to distribute an unspecified number of users through the electronic network 115 or in the case where an attempt is made to search or identify an author by the electronic work 101a, the electronic work 101a is provided.

At step S1230, the electronic work 101a is stored in the work storage section 102. In this manner, the electronic work 101a into which the electronic independent signature 101c is inserted can be distributed through the electronic network 115. In addition, when the searcher searches the electronic work 101a, information on the author's name or the like is obtained. In addition, when the identification requester makes a request for identification of a work, the identity can be precisely collated.

At step S1240, when the electronic work 101a is stored in the work storage section 102, some signature positions or work use purposes approved in advance can be stored. In addition, an approval for use of the electronic work 101a can be done through the electronic network 115 including the signature position or work use purpose.

Figure 8:
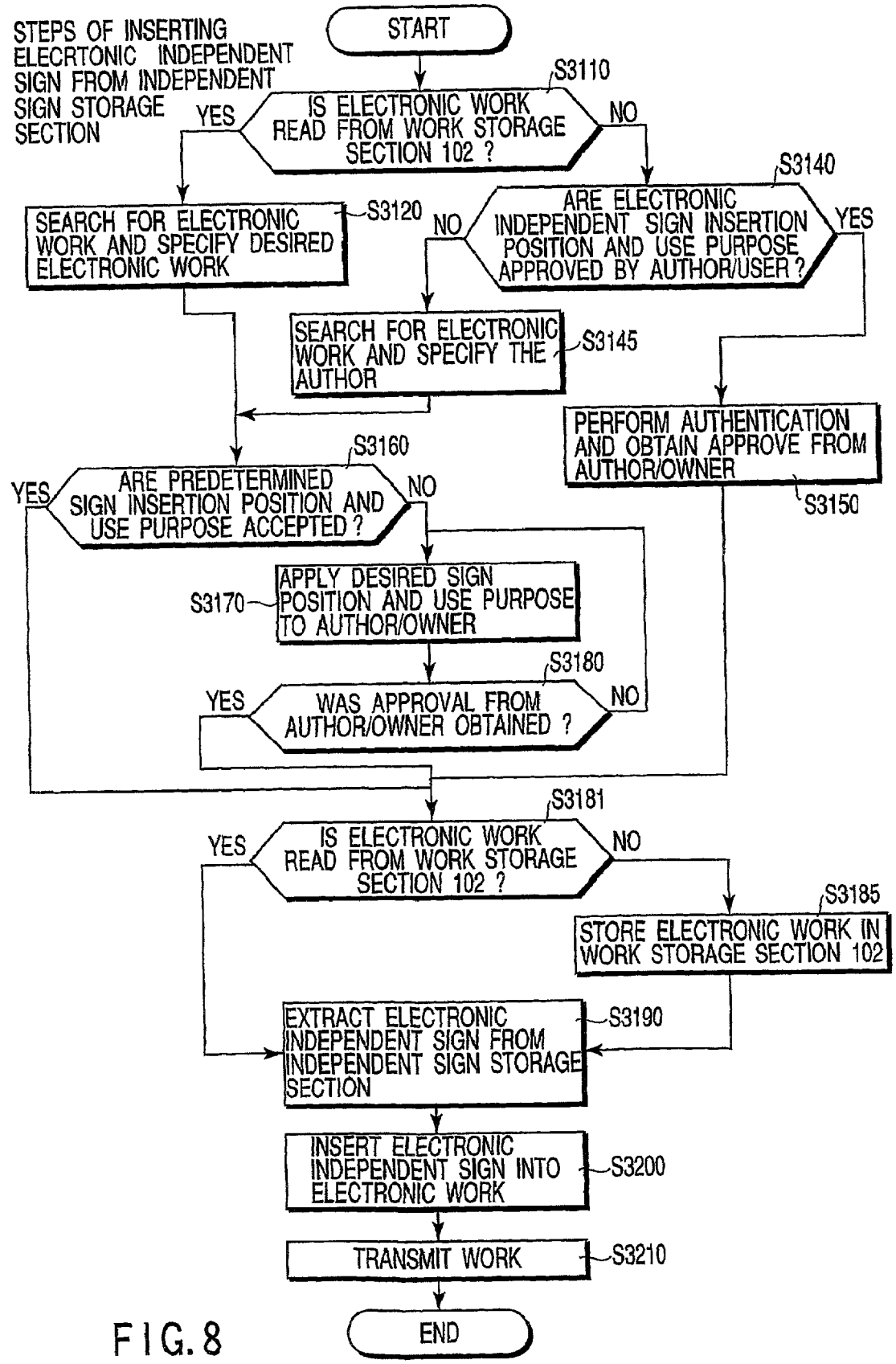
FIG. 8 is a flowchart of the steps for inserting an electronic independent signature according to the present embodiment.

Now, steps of inserting the electronic independent signature 101c will be described in accordance with a flowchart of inserting a signature shown in FIG. 8.

At step S3110, the electronic work 101a into which the electronic independent signature 101c is inserted can be selected from one of the work stored in the work storage section 102 of an electronic signature storage company or possessed by a user.

In the case where the electronic work 101a stored in the work storage section 102 of the electronic signature storage company is to be used, a target electronic work 101a is determined at step S3120 from among the electronic works 101a stored in the work storage section 102. In the case where the target electronic work 101a is not determined yet, the electronic work 101a to be used is determined by making a search. For example, in the case where an attempt is made to use a photograph of Mt. Fuji, a search is made by defining "Mt. Fuji" as a keyword, and the electronic work 101a for use in the search result is determined.

On the other hand, in the case where the electronic work 101a possessed by a user is to be used, the user applies a signature insertion position or work use purpose to the electronic signature storage company. It is necessary for the electronic signature storage company before inserting the signature to confirm that the author or owner approves the signature insertion position or work use purpose. If the author or owner directly passes to a user the electronic work to be used, it can be regarded that the signature position or work use purpose is approved. Therefore, it is not necessary to execute step S3160 in which the signature position or work use purpose is approved. However, it is not desirable to pass step S3160 only depending on the user's application. Therefore, it is determined at step S3140 whether the signature position or work use purpose is applied by the author or owner. It can be regarded that the signature position or work use purpose applied to the electronic signature storage company was approved by the author or owner.

If it is determined that the signature position or work use purpose was applied to the electronic signature storage company by the author or owner at step S3140, the signature position approval section 107 and the work use purpose approval section 108 determine at step S3150 whether or not the author or owner approved or the approval by the user equals to the approval by the author or owner. The determination is made by using a general certification technique in which the author or owner is required to enter the name or password. If the certification succeeds, the signature position approval section 107 and the work use purpose approval section 108 approve the signature position or the work use purpose.

If it is determined that the signature position or work use purpose was not applied to the electronic signature storage company by the author or owner at step S3140, an electronic work stored in the work storage section 102 and of the same author or having high quality contents is searched for at step S3145.

When the electronic work 101a is specified at step S3120 or S3145, it is determined at step S3160 whether the user accepts the predetermined signature insertion position and the work use purpose which are stored in correspondence with the electronic independence signature 101c or the electronic work 101a. If the user does not accept the predetermined signature insertion position and the work use purpose, the user applies at step S3170 a desired signature insertion position and work use purpose to the author or owner. At step S3180, it is determined whether the author or owner approves the applied signature insertion position and work use purpose.

In the case where it is determined to be approved at step S3180, where it is determined that the user accepts the predetermined signature insertion position and the work use purpose at step S3160, or where the approval by the author or owner is obtained at step S3150, it is determined at step S3181 whether an electronic work into which the electronic independent signature 101c is inserted is the electronic work 101a of the electronic signature storage company or is an electronic work possessed by the user.

In the case of using an electronic work possessed by the user, the electronic signature storage company receives the electronic work from the user at step S3185, and temporary stores it in the work storage section 102. If the electronic work 101a is registered into the work storage section 102, the company stores it in the work storage section 102 in accordance with the storage steps (refer to FIG. 7C).

At step S3190, the electronic independent signature 101c is extracted from the independent signature storage section 103.

At step S3200, the electronic independent signature 101c is inserted into an approved signature position of the electronic work 101a extracted from the work storage section 102 by means of the signature insertion section 106.

At step S3210, the electronic independent signature 101c is inserted into an approved signature position, and the electronic work 101a whose work use purpose is approved is transmitted to a user through the electronic network 115.

In actual practice, the author or owner determines four signature positions and determines a work use purpose that is approved or a work use purpose that is not approved (refer to steps S1160 and S1240).

The user searches the electronic work 101a by this system though the Internet (refer to step S3120), selects a signature position that is not competed with the character layout, checks that the work use purpose is proper (refer to step S3160), and transmits the signature position and work use purpose to the signature insertion section 106 by selecting and describing them. Then, the signature position and work use purpose are approved (refer to step S3160), and a signature is inserted into a work (refer to steps S3190 and S3200). Here, the user can download the work (refer to step S3120). If an attempt is made to use another signature position or another work use purpose, the electronic signature storage company requests the author or owner for approval through the electronic network 115, facsimile or the like and for determining whether or not to approve use of the electronic work 101a (refer to steps S3170 and S3180).

Figure 9A:
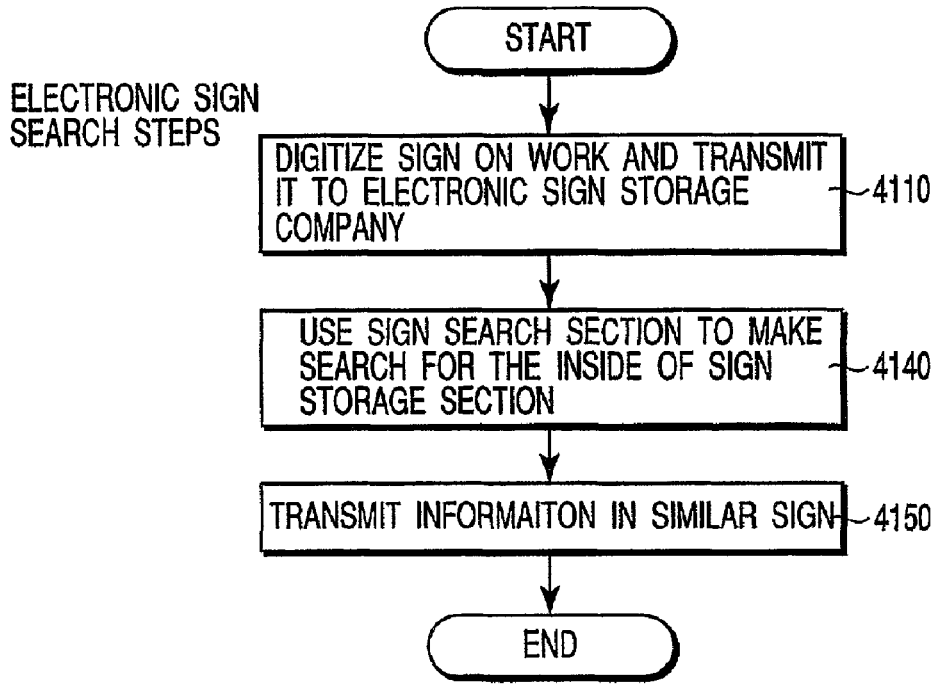
FIG. 9A is a flowchart of the steps for searching for an electronic signature according to the second embodiment.
Figure 9B:
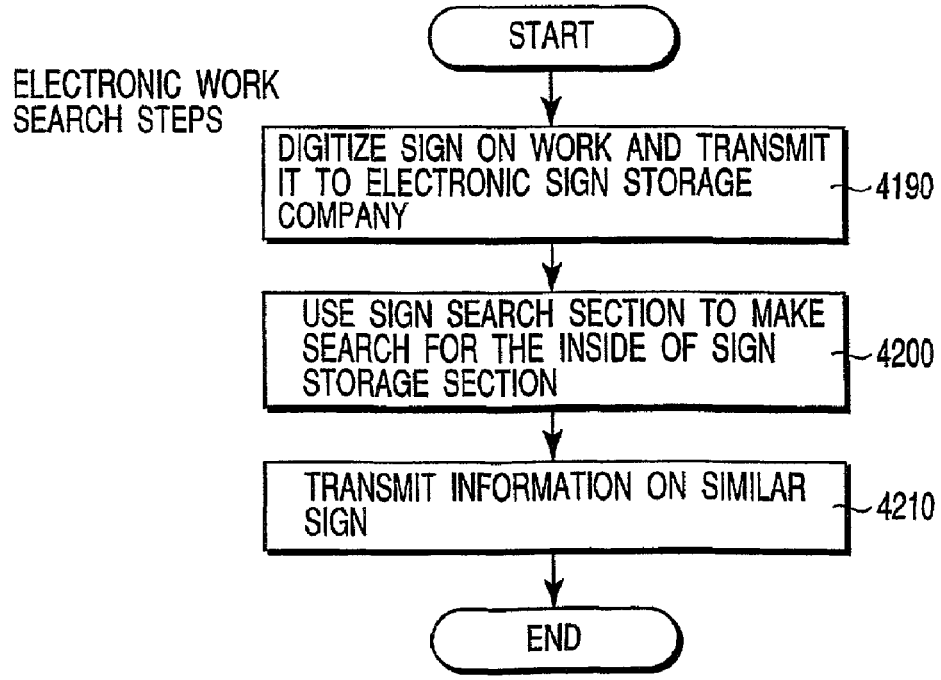
FIG. 9B is a flowchart of the steps for searching for an electronic work according to the second embodiment.

Now, the signature or work search steps will be described in accordance with a flowchart of the signature/work search steps shown in FIGS. 9A and 9B. FIG. 9A is a flowchart showing the electronic signature search steps; and FIG. 9B is a flowchart showing the search steps of the electronic work 101a.

At step S4110 shown in FIG. 9A, the user digitizes a signature of a desired work, and transmits it to the electronic signature storage company through the electronic network 115.

At step S4140, the user searches an electronic signature stored in the independent signature storage section 103 or specific signature storage section 104 by means of the signature/work storage section 109.

At step S4150, information on author's name associated with similar signature or the like from the search result is transmitted to the user through the electronic network 115.

At step S4190 shown in FIG. 9B, the user digitizes a desired work, and transmits it to the electronic signature storage company through the electronic network 115.

At step S4200, an electronic signature stored in the signature storage section 105 is searched by the signature/work search section 109.

At step S4210, information on the author's name associated with a similar work or the like from the search result is transmitted to the user through the electronic network 115.

Figure 10A:
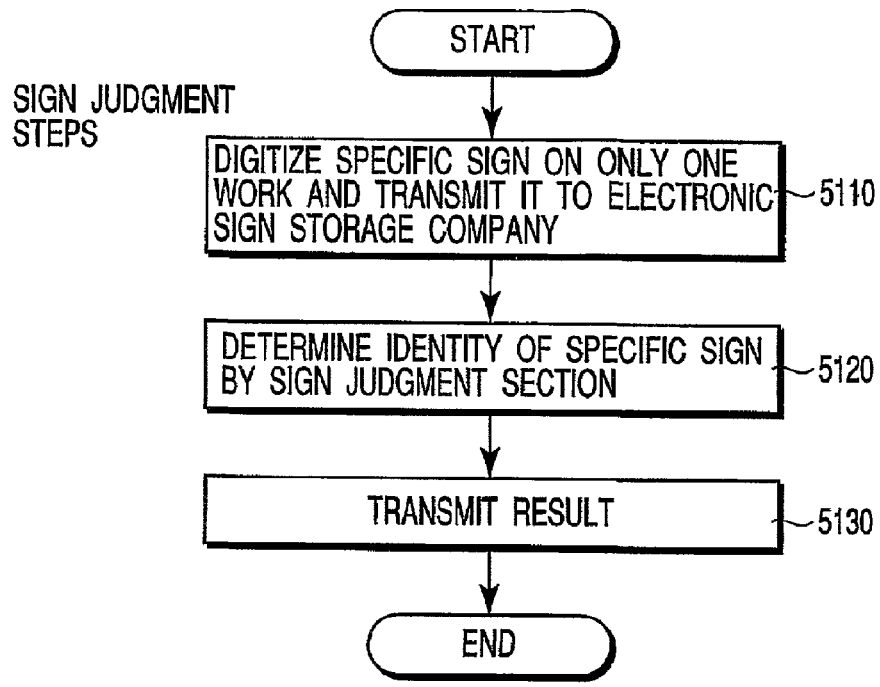
FIG. 10A is a flowchart of the steps for judging the identity of an electronic signature according to the second embodiment.
Figure 10B:
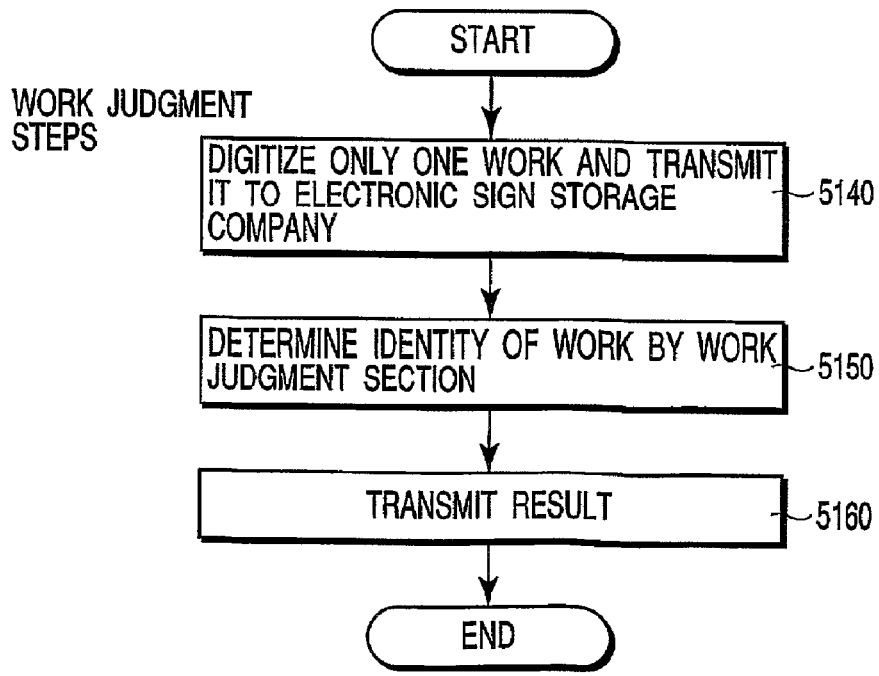
FIG. 10B is a flowchart of the steps for judging the identity of an electronic work according to the second embodiment.

Now, the signature or work identity judgment steps will be described in accordance with a flowchart of the signature/work identity judgment steps shown in FIG. 10A and FIG. 10B. FIG. 10A is a flowchart showing the signature identity judgment steps; and FIG. 10B is a flowchart sowing the work identity judgment steps.

At step S5110 shown in FIG. 10A, the user digitizes a specific signature of a desired work, and transmits it to the electronic signature storage company through the electronic network 115.

At step S5120, it is determined by a signature identification section 111 as to the identity between the electronic specific signature 101b stored in the specific signature storage section 104 and an electronic signature transmitted from an identification requester, thereby identifying an author.

At step S5130, the identification result is transmitted to the user through the electronic network 115.

At step S5140 shown in FIG. 10B, the user digitizes desired only one work, and transmits it to the electronic signature storage company through the electronic network 115.

At step S5150, the identity between the electronic work 101a stored in the work storage section 102 and an electronic work transmitted from the identification requester is determined by a work identification section 111, to thereby identify an author.

At step S5160, the identification result is transmitted to the user through the electronic network 115.

Hereinafter, an example of application according to the present invention will be described.

(a) Approval for using an electronic work to a user when an electronic work is already stored:

An electronic signature storage company stores an author's or owner's electronic independent signature 101c and the electronic work 101a. A user searches for a desired electronic work 101a (refer to steps S3110 and S3120 ). At step S3160, the user applies the work use purpose to the electronic signature storage company and the user judges whether or not the predetermined signature insertion position and the work use purpose is accepted. It is not accepted, the user applies a desired signature insertion position and work use purpose to the company at step S3170. At step S3180, it is determined whether the author or owner approves the user-desired signature insertion position and work use purpose. If an affirmative decision is obtained in step S3160 or S3180, an affirmative decision is also obtained in step S3181.

The electronic independent signature 101c is extracted from the independent signature storage section 103 at step S3190. The electronic independent signature 101c is inserted into an approved signature position of the electronic work 101a extracted from the work storage section 102 by means of the signature insertion section 106 at step S3200. The electronic independent signature 101c is inserted into an approved signature position, and the electronic work 101a whose work use purpose is approved is transmitted to a user through the electronic network 115 at step S3210.

(b) Approval for using an electronic work to a user when no electronic work is stored:

An electronic signature storage company stores an author's or owner's electronic independent signature 101c. The author or owner directly gives approval for use to a user, and the user requests the electronic signature storage company to insert a signature (refer to steps S3110 and S3140). Since the user possesses the electronic work; step S3140 is executed after step S3110. In order to confirm that the author or owner approves the signature insertion position and work use purpose, the user enters the name and the password at step S3150. If the user is certified, a negative decision is obtained in step S3181 and the electronic work transmitted from the user is stored in the storage section 102 at step S3185.

The electronic independent signature 101c is extracted from the independent signature storage section 103 at step S3190. The electronic independent signature 101c is inserted into an approved signature position of the electronic work 101a extracted from the work storage section 102 by means of the signature insertion section 106 at step S3200. The electronic independent signature 101c is inserted into an approved signature position, and the electronic work 101a whose work use purpose is approved is transmitted to a user through the electronic network 115 at step S3210.

(c) When the user wants to use an electronic work whose author is unknown, using no search parameters:

An author or owner is specified by searching an electronic signature or electronic work as shown in FIG. 9A or FIG. 9B. In the case where the author or owner has been specified, if the electronic work is stored in the work storage section 102 of the electronic signature storage company, a processing similar to (a) is performed.

In the case where no work is stored, a negative decision is made in steps S3110 and S3140, the user applies the work use purpose to the electronic signature storage company and the user judges whether or not the predetermined signature insertion position and the work use purpose is accepted at step S3160. It is not accepted, the user applies a desired signature insertion position and work use purpose to the company at step S3170. At step S3180, it is determined whether the author or owner approves the user-desired signature insertion position and work use purpose. If an affirmative decision is obtained in step S3160 or S3180, an affirmative decision is also obtained in step S3181.

The electronic independent signature 101c is extracted from the independent signature storage section 103 at step S3190. The electronic independent signature 101c is inserted into an approved signature position of the electronic work 101a extracted from the work storage section 102 by means of the signature insertion section 106 at step S3200. The electronic independent signature 101c is inserted into an approved signature position, and the electronic work 101a whose work use purpose is approved is transmitted to a user through the electronic network 115 at step S3210.

(d) Search when an electronic signature or electronic work is defined as a search parameter:

Conventionally, a work has been searched by defining a character string or numeric value such as author, age, or title of the work. In the case where the user does not know an author or title of the work even if he or she has an image at hand, such an author or title of the work could not be searched for. However, the author or title of the work can be searched from an electronic signature or electronic work by using a signature search section 109 (refer to FIG. 9A and FIG. 9B). Thus, even when the user attempts to use an electronic work, there is eliminated a case in which an approval cannot be obtained because the user does not know the author or owner of the desired work.

(e) Identification of an author using a signature in an auction:

An electronic signature storage company (a specific signature storage section 104) stores a work specific signature. When an auction company or the like that is a user of this system specifies an author of a work, the user can correctly identify the author by identifying digital data of a signature of a work exhibited in auction and an electronic specific signature stored in the specific signature storage section 104 (refer to FIG. 10A and FIG. 10B).

The entire work can be identified without being limited to a signature.

According to a work electronic signature management system of the present embodiment, there are provided a signature storage section which stores digitized signatures, a work storage section which stores digitized works, and a signature insertion section which inserts a signature selected from the signature storage section into a work selected from the work storage section. There may be further provided an electronic network for directly or indirectly connecting the signature storage section, work storage section, and signature insertion section to a customer's electronic system. The signature selected from the signature storage section is inserted into the work selected from the work storage section by means of the signature insertion section in response to a request received through the electronic network, and the work is transmitted through the electronic network in response to the request. In this manner, in distributing a digitized work, a proper position into which a digitized signature on a digitized work is inserted is determined through the electronic network, a signature is inserted into that position, and a work into which the signature is inserted is distributed to an unspecified number of customers through the electronic network.

There is further provided a signature judgment section which compares a signature stored in the signature storage section with a signature to be determined, and judges the identity. The judgment section is directly or indirectly connected to the electronic network. In response to a request received through the electronic network, the result obtained by comparing the signature stored in the signature storage section with the signature to be determined and judging the identity is transmitted to the requester through the electronic network, whereby the identity of the digitized signature can be precisely determined through the electronic network.

There is further provided a work judgment section which compares the work stored in the work storage section with a work to be determined, and judges the identity. The judgment section is directly or indirectly connected to the electronic network. In response to a request received through the electronic network, the result obtained by comparing the work stored in the work storage section with the work to be determined and judging the identity is transmitted to the requester through the electronic network, whereby the identity of the digitized work can be precisely determined through the electronic network.

The signature insertion section comprises a signature position approval section, wherein, only in the case where a signature position corresponds to a signature position approved in advance or a newly approved signature position, the signature insertion section inserts a signature into a signature position approved on a work, whereby a digital signature can be inserted into a signature position approved on a digitized work. The signature position desired by the author or owner and the user can be electronically determined, thereby making it possible to prevent a signature from being inserted into an author or owner undesired position.

The signature insertion section comprises a work use purpose approval section, wherein, only in the case where a work use purpose corresponds to a work use purpose approved in advance or a newly approved work use purpose, the signature insertion section inserts a signature into a signature position approved on a work, whereby the use purpose of a digitized work can be electronically approved, making it possible for the author or owner to prevent undesired use of the work.

There is provided a signature search section which searches for a signature from a signature storage section, the signature search section being directly or indirectly connected to the electronic network, wherein, in response to a request received through the electronic network, the result obtained by searching a signature from the signature storage section by means of the signature search section is transmitted to the requester through the electronic network, whereby a digitized signature can be searched through the electronic network, and the author or owner of the work can be electronically specified from the signature.

There is provided a work search section which searches for a work from a work storage section, the work search section being directly or indirectly connected to the electronic network, wherein, in response to a request received through the electronic network, the result obtained by searching a work from the work storage section by means of the work search section is transmitted to the requester through the electronic network, whereby a digitized work can be searched through the electronic network, and the author or owner of the work can be electronically specified from the work.

According to the second embodiment, a signature in an individual piece of work is one factor that specifies that work. By digitizing and storing the signature of work "A", when work "B" appears later, the signature of the stored and digitized work "A" and the digitized signature of work "B" are compared with each other, thereby making it possible to electronically identify whether or not the works "A" and "B" are identical to each other. The references used for identification include the shape, area, and color of the signature, as described in the first embodiment. The degree of deviation of each of the shape, area, and color is obtained relevant to each of the signatures of the works "A" and "B", and the test of hypothesis is performed by using the null hypothesis and alternative hypothesis.

Any shape and object can be searched without being limited to only one work.

As has been described above, according to the present invention, a work or signature is obtained as digital data, and the degree of deviation is numerically obtained, thereby making it possible to precisely judge the identity. In addition, an electronic work identity judgment technique is added to visual inspection, knowledge, and experience of an expert in the field or of the creator of the work, to thereby identify the author of the work more precisely.

In the work signature management system according to the present invention, before a digitized work is distributed through the electronic network, a proper signature insertion position on the digitized work is determined, and a signature is inserted into that position, whereby the work into which the signature has been inserted is distributed.

The present invention is not limited to the above described embodiments, and various modifications can be made occur. For example, the present invention can be implemented as a computer readable recording medium having stored therein a program causing a computer to execute a predetermined section (or causing a computer to function as a predetermined section or achieve a predetermined function).

The invention claimed is:

1. A work identification system comprising:
    a work storage configured to store digital data representing a shape, area, and color of an only one work;
    a collation section configured to calculate a degree of deviation between digital data representing a shape, area, and color of a target work to be identified and the digital data stored in the work storage; and
    a test section configured to perform a test of hypothesis based on a predetermined hypothesis using the degree of deviation.

2. The system according to claim 1, wherein
    said work storage stores the digital data representing a shape, area, and color of a signature attached to an only one work; and said collation section calculates the degree of deviation between digital data representing a shape, area, and color of a signature attached to the target work to be identified and the digital data stored in the work storage.

3. The system according to claim 2, wherein said test section performs the test using a variance of the degree of deviation.

4. The system according to claim 2, wherein said test section performs the test using a mean of the degree of deviation.

5. The system according to claim 2, wherein said collation section calculates the degree of deviation for sub regions dividing the signature in a matrix manner.

6. The system according to claim 2, wherein said collation section calculates the degree of deviation between digital data representing the color in accordance with color fading and change of color.

7. The system according to claim 2, wherein said test section determines whether the target work is identical to the only one work.

8. The system according to claim 1, wherein
said work storage stores a plurality of digital data of the only one work; and
said test section searches said work storage to find one of the plurality of digital data of the only one work which is most similar to the target work.

9. A work identification system comprising:
a work storage configured to store digital data representing a shape, area, and color of a result of projection of an only one work onto a two-dimensional plane;
a collation section configured to calculate a degree of deviation between digital data representing a shape, area, and color of a result of projection of a target work to be identified onto the two-dimensional plane and the digital data stored in the work storage; and
a test section configured to perform a test of hypothesis based on a predetermined hypothesis using the degree of deviation.

10. The system according to claim 9, wherein said test section performs the test using a variance of the degree of deviation.

11. The system according to claim 9, wherein said test section performs the test using a mean of the degree of deviation.

12. The system according to claim 9, wherein said collation section calculates the degree of deviation for each of sub regions dividing the result of projection in a matrix manner.

13. The system according to claim 9, wherein said collation section calculates the degree of deviation between digital data representing the color in accordance with color fading and change of color.

14. The system according to claim 9, wherein said test section determines whether the target work is identical to the only one work.

15. The system according to claim 9, wherein
said work storage stores a plurality of digital data of the only one work; and
said test section searches said work storage to find one of the plurality of digital data of the only one work which is most similar to the target work.

16. A work identification system comprising:
a work storage configured to store digital data representing a color of an only one work;
a collation section configured to calculate a degree of deviation between digital data representing a color of a target work to be identified and the digital data stored in the work storage; and
a test section configured to perform a test of hypothesis based on a predetermined hypothesis using the degree of deviation;
wherein said collation section calculates the degree of deviation between digital data representing the color in accordance with color fading and change of color.

17. The system according to claim 16, wherein said test section performs the test using a variance of the degree of deviation.

18. The system according to claim 16, wherein said test section performs the test using a mean of the degree of deviation.

19. The system according to claim 16, wherein said collation section calculates the degree of deviation for each of sub regions dividing the only one work in a matrix manner.

20. The system according to claim 16, wherein said test section determines whether the target work is identical to the only one work.

21. The system according to claim 16, wherein
said work storage stores a plurality of digital data of the only one work; and
said test section searches said work storage to find one of the plurality of digital data of the only one work which is most similar to the target work.

* * * * *